United States Patent [19]
Kimura et al.

[11] Patent Number: 5,504,847
[45] Date of Patent: Apr. 2, 1996

[54] RANGE-IMAGE PROCESSING APPARATUS AND METHOD

[75] Inventors: Takeo Kimura, Yokohama; Haruo Shimizu, Kawasaki; Osamu Yoshizaki, Hachioji; Yoshifumi Kitamura, Nara, all of Japan

[73] Assignee: Canon Kabushiki Kaisha, Tokyo, Japan

[21] Appl. No.: 160,021

[22] Filed: Dec. 1, 1993

[30] Foreign Application Priority Data

Dec. 1, 1992 [JP] Japan .................................. 4-321636
Dec. 4, 1992 [JP] Japan .................................. 4-325554

[51] Int. Cl.$^6$ .................................................. G06F 15/72
[52] U.S. Cl. .................................................. 395/133
[58] Field of Search .................................. 395/133, 125, 395/141, 129, 136; 345/118, 121

[56] References Cited

U.S. PATENT DOCUMENTS 5,369,736  11/1994  Kato et al. .................................. 395/125

OTHER PUBLICATIONS

"Integration of Synthetic Surface Relief in Range Image" By P. Boulanger et al.; Computer Vision Graphics And Image Processing; vol. 47; No. 3; Sep., 1989, New York, US; pp. 361–372.

"Extracttion of Polygonal Faces in Range Images" by B. Groshong et al.; Topical Meeting On Machine Vision; Mar. 1985 USA; pp. 1–4.

"Generation of 3D Surface Descriptions from Images of Pattern–Illuminated Objects" by Michael Potmesil; Proceedings Of The 1979 IEEE Computer Society Conference On Pattern Recognition And Image Processing; Aug. 6, 1979; New York, US; pp. 553–560.

"Range Data Processing; Representation of Surfaces by Edges" by Bhanu et al; Eighth Int'l Conf. On Pattern Recognition (Proceedings); 1986 FR. pp. 236–238.

"Invariant Surface Segmentation through Energy Minimization With Discontinuities"; International Journal Of Computer Vision; vol. 5, No. 2, Nov. 1990 NL. pp. 161–194.

*Primary Examiner*—Phu K. Nguyen
*Attorney, Agent, or Firm*—Fitzpatrick, Cella, Harper & Scinto

[57] ABSTRACT

Plural range images having different resolutions are generated from an input range image and normal vectors are calculated for each generated range image. An edge map is formed for each of the plural range images based on the calculated normal vectors and a single edge map is formed by synthesizing the plural formed edge maps. Polygon data describing the surface shape of an object represented by the input range image are formed based on the synthesized edge map. Polygon data of high precision that represents characteristics of the surface shape of the object is thereby formed with little data.

24 Claims, 29 Drawing Sheets

FIG.7 polygon /* declaration of polygon data */
vertices /* start of vertex information */
  components = x y z normal - x normal - y normal - x
                  /* attribute of each vertex
                     three-dimensional coordinate values always x,y,z included
                     declare have if included */
                  /* number of following vertices */

(78.00  30.00  -61.80  -0.297  -0.954  -0.031) /* vertex number 1 */
  (78.00  33.00  -68.29  -0.545  -0.733  -0.407) /* vertex number 2 */
  (81.00  33.00  -71.14  -0.376  -0.739  -0.559) /* vertex number 3 */
  (81.00  30.00  -33.75  -0.488  -0.740  -0.464) /*      :       */
  (84.00  33.00  -72.58  -0.241  -0.711  -0.661)
  (84.00  30.00  -69.12  -0.342  -0.733  -0.588)
  (87.00  33.00  -73.26  -0.085  -0.681  -0.727)

(81.00  111.00  -67.23  -0.421  0.767  -0.484)
  (84.00  111.00  -69.85  -0.404  0.780  -0.477) /*      :       */
  (87.00  111.00  -72.17   0.199  0.979  -0.040) /* vertex number 583 */
  (90.00  111.00  -73.98  -0.007  1.000  -0.022) /* vertex number 584 */ connectivity           /* start of topological information */
components=variable.i
  (3   1   2   3)
  (3   1   3   4)              /* number of vertices consituting a polygon and
  (3   4   3   5)                 a sequence of their vertex numbers */
  (3   6   5   7)
  (3   8   7   9)
  (3  11  12   2)
  (3   2  13   3)
  (3   3  14   5)
  (3   5  15   7)
  (3   7  16   9)
  (3   9  17  19)

(3  573  581  574)
  (3  574  582  575)
  (3  575  583  576)
endpolygon          /* end of polygon data */

FIG.8

COMPARISON OF NUMBER OF POLYGONS (NUMBER)

| RESOLUTION | PRESENT EMBODIMENT | CONVENTIONAL EXAMPLE |
|---|---|---|
| 1/2 | 12973 | 26054 |
| 1/4 | 4975 | 6566 |
| 1/8 | 1503 | 1637 |
| 1/16 | 413 | 418 |

COMPARISON OF VOLUME ERROR (%)

| RESOLUTION | PRESENT EMBODIMENT | CONVENTIONAL EXAMPLE |
|---|---|---|
| 1/2 | 0.226 | 0.280 |
| 1/4 | 0.323 | 0.696 |
| 1/8 | 0.958 | 1.831 |
| 1/16 | 1.745 | 3.193 |

(a) φ1>0    (b) φ1≤θ    0≤θ≤90°
0≤φ1≤90°

(a) φ2<90°-θ    (b) φ2≥90°-θ    0≤θ≤90°
0≤φ2≤90°

RANGE-IMAGE PROCESSING APPARATUS AND METHOD

BACKGROUND OF THE INVENTION

1. Field of the Invention

This invention relates to a range-image processing apparatus for forming polygon data which approximately describe the surface shape of an object represented by a range image from the input range image.

2. Description of the Related Art

Before describing a conventional technique, a brief explanation of technical terms relating to the present invention will be provided.

First, a "range image" indicates an image in which the vertical distance between each point on the surface of an object measured by a distance-measuring sensor and a reference plane is provided as a pixel (picture element) value. As a data format, distance value Z is stored for each point (X, Y) on a square two-dimensional lattice. Such data have recently been utilized in the field of computer vision and computer graphics.

Next, "polygon data" indicate data for approximately representing the surface shape of an object by combining polygons, each of which is present on the same plane. FIG. 7 illustrates a polygon-data structure which uses triangles as polygons. This data structure is composed of two portions. In the first portion, information relating to vertices constituting each polygon is assigned. In this example, for each vertex, in addition to (x,y,z) value of vertex information, which is indispensable data, normal-vector value (Nx,Ny,Nz) at the vertex is also provided as optional data. In the second portion, connection information of edge lines constituting each polygon is indicated for the assigned vertex information. The number n (3 in this example) of vertices constituting each polygon is first provided followed by n vertex numbers representing respective vertices constituting the polygon.

A range-image processing apparatus has, for example, been devised, in which three-dimensional position coordinate data of the surface of an object are input from a three-dimensional-coordinate measuring device, such as a laser range finder or the like, the obtained range image is uniformly divided with a fixed equidistant square lattice, and polygon data for approximating the surface of the object in units of a square obtained by connecting the vertices of adjacent lattice points are found.

In the above-described conventional apparatus, however, since polygons of the same kind are utilized for the entire range image, the number of polygons and the amount of data increase if it is intended to improve approximation accuracy for an object having a complicated shape.

On the other hand, if it is intended to suppress the amount of data to a certain degree, the size of each polygon must be increased while reducing the number of polygons. Hence, accuracy in approximation deteriorates, and details in the shape of the object cannot be reproduced.

In addition, if only one non-closed edge is present in an edge map formed from the range image, polygon data cannot be formed.

Furthermore, in the above-described conventional approach, adjacent pixels must always be subjected to edge detection processing so that even for an object having a very simple shape, a large amount of useless calculation must, in some cases, be performed. In addition, since a curved surface is recognized as one region, the recognition result cannot be directly used for forming polygon data when it is intended to approximate the shape of an object by planes. Moreover, since each edge which must be represented as a line segment is represented by connection of points on the image, a large amount of storage region is required, and it is difficult to process the edge as a line segment.

SUMMARY OF THE INVENTION

It is an object of the present invention to obtain polygon data having the same degree of accuracy as in the conventional approach with a smaller amount of data.

It is another object of the present invention to obtain polygon data having higher accuracy than in the conventional approach with the same amount of data.

It is a further object of the present invention to reduce the amount of polygon data, and to reduce the capacity of a memory required for storing the polygon data.

It is a still further object of the present invention to reduce the amount of polygon data, and to reduce the time required for displaying the polygon data.

It is still another object of the present invention to obtain polygon data having a quality corresponding to an application.

It is still a further object of the present invention to obtain polygon data which represent characteristics of an object in an excellent manner.

It is yet another object of the present invention to obtain polygon data in which edges are guaranteed to be closed.

It is yet a further object of the present invention to provide a method of forming polygon data in which polygons can be securely segmented in a simple manner.

According to one aspect, the present invention which achieves these objectives relates to a range-image processing apparatus comprising input means for inputting a range image, generation means for generating a plurality of range images having different resolutions from the range image input by the input means, calculation means for calculating normal vectors for each of the plurality of range images generated by the generation means, edge-map formation means for forming an edge map for each of the plurality of range images based on the normal vectors calculated by the calculation means, synthesis means for synthesizing a single edge map by synthesizing the plurality of edge maps formed by the edge-map formation means, and polygon-data formation means for forming polygon data for describing the surface of the object represented by the range image input by the input means based on the edge map synthesized by the synthesis means.

According to another aspect, the present invention which achieves these objectives relates to a range-image processing apparatus comprising input means for inputting a range image, calculation means for calculating normal vectors for the range image input by the input means, edge-map formation means for forming an edge map for the range image based on the normal vectors calculated by the calculation means, detection means for detecting non-closed edges by scanning the edge map formed by the edge-map formation means, shaping means for deleting or extending the non-closed edges detected by the detection means, and polygon-data formation means for forming polygon data for describing the surface shape of the object represented by the range image input by the input means based on the edge map shaped by the shaping means.

According to a further aspect, the present invention which achieves these objectives relates to a range-image processing apparatus comprising input means for inputting a range image, calculation means for calculating normal vectors for the range image input by the input means, setting means for setting a scanning interval for scanning the range image input by the input means, edge detection means for scanning the range image input by the input means with the interval set by the setting means and for detecting edges in the range image based on the input range image and the normal vectors calculated by the calculation means, edge generation means for generating new edges based on the input range image and the normal vectors calculated by the calculation means, and edge-map formation means for forming an edge map based on the edges detected by the edge detection means and the edges generated by the edge generation means.

According to a still further aspect, the present invention which achieves these objectives relates to a range-image processing method comprising the steps of inputting a range image, generating a plurality of range images having different resolutions from the input range image and calculating normal vectors for each of the plurality of generated range images, forming an edge map for each of the plurality of range images based on the calculated normal vectors, forming a single edge map by synthesizing the plurality of formed edge maps, and forming polygon data for describing the surface shape of the object represented by the input range image based on the synthesized edge map.

According to still another aspect, the present invention which achieves these objectives relates to a range-image processing method comprising the steps of inputting a range image, calculating normal vectors based on the input range image, forming an edge map for the range image based on the calculated normal vectors, detecting non-closed edges by scanning the formed edge map, performing a shaping operation which deletes or extends the detected non-closed edges, and forming polygon data for describing the surface shape of the object represented by the input range image based on the shaped edge map.

According to still a further aspect, the present invention which achieves these objectives relates to a range-image processing method comprising the steps of inputting a range image, calculating normal vectors for the input range image, setting a scanning interval for scanning the input range image, scanning the input range image with the set interval, detecting edges in the range image based on the input range image and the calculated normal vectors, generating new edges based on the input range image and the calculated normal vectors, and forming an edge map based on the detected edges and the generated edges.

Other objectives and advantages besides those discussed above shall be apparent to those skilled in the art from the description of preferred embodiments of the invention which follows. In the description, reference is made to the accompanying drawings, which form a part thereof, and which illustrate examples of the invention. Such examples, however, are not exhaustive of various embodiments of the invention, and therefore reference is made to the claims which follow the description for determining the scope of the invention.

BRIEF DESCRIPTION OF THE DRAWIGS

Figure 4A:
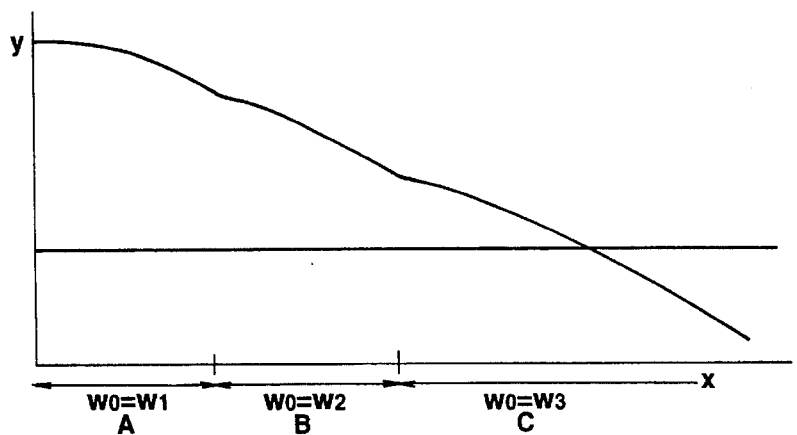
Figure 4B:
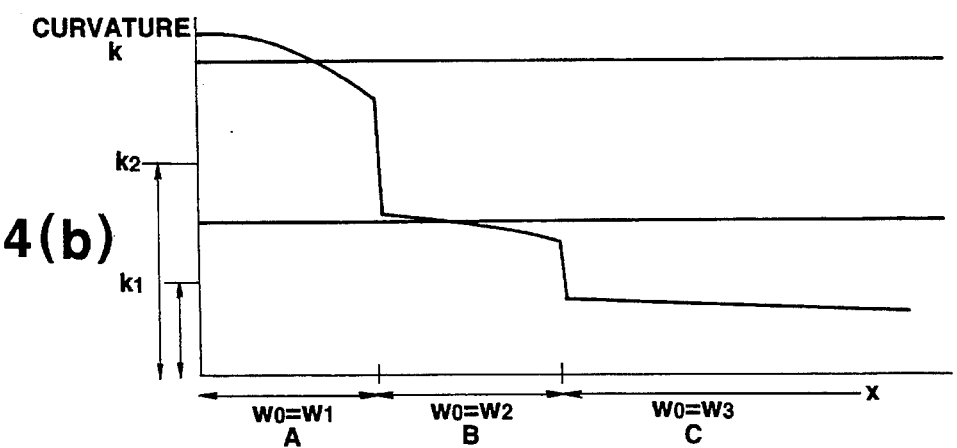
Figure 5A:
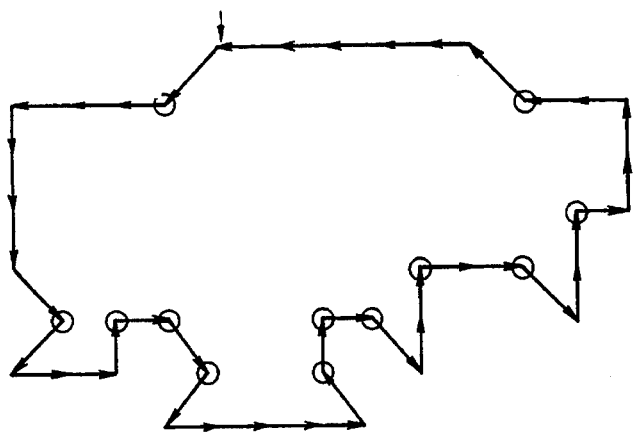
Figure 5B:
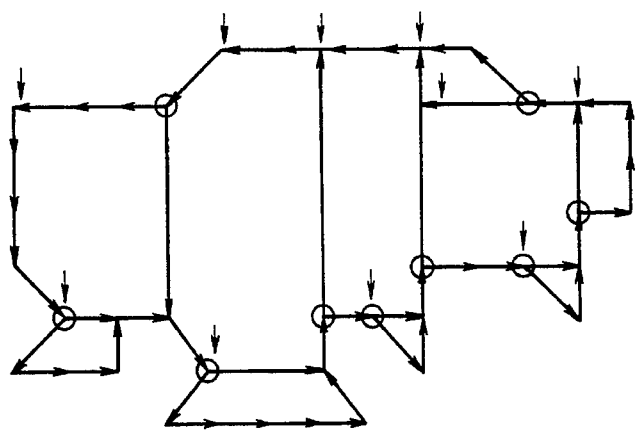
Figure 5C:
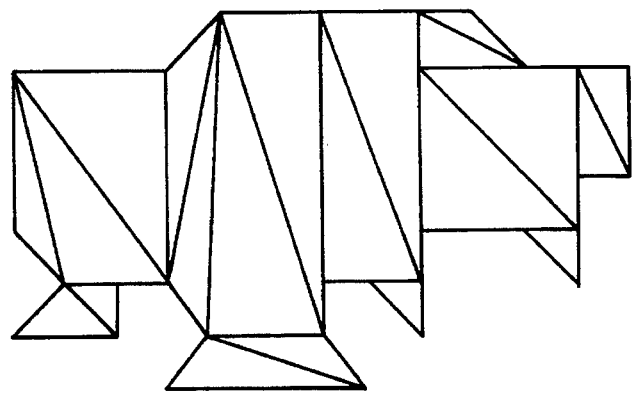
Figure 9:
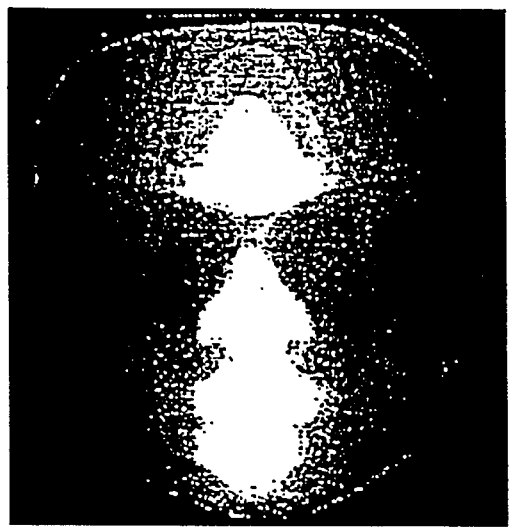
Figure 10:
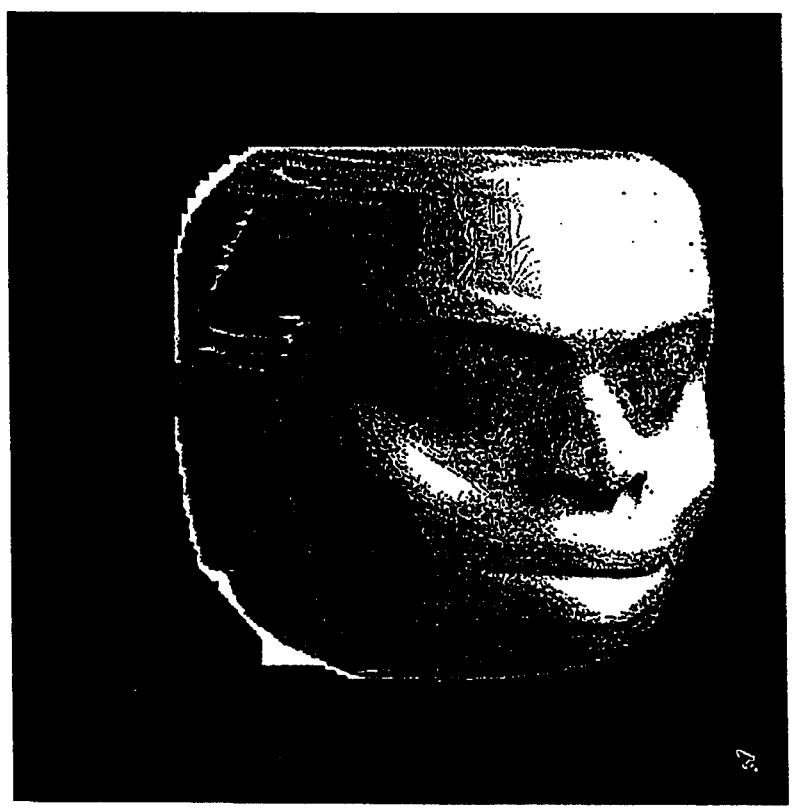
Figure 11:
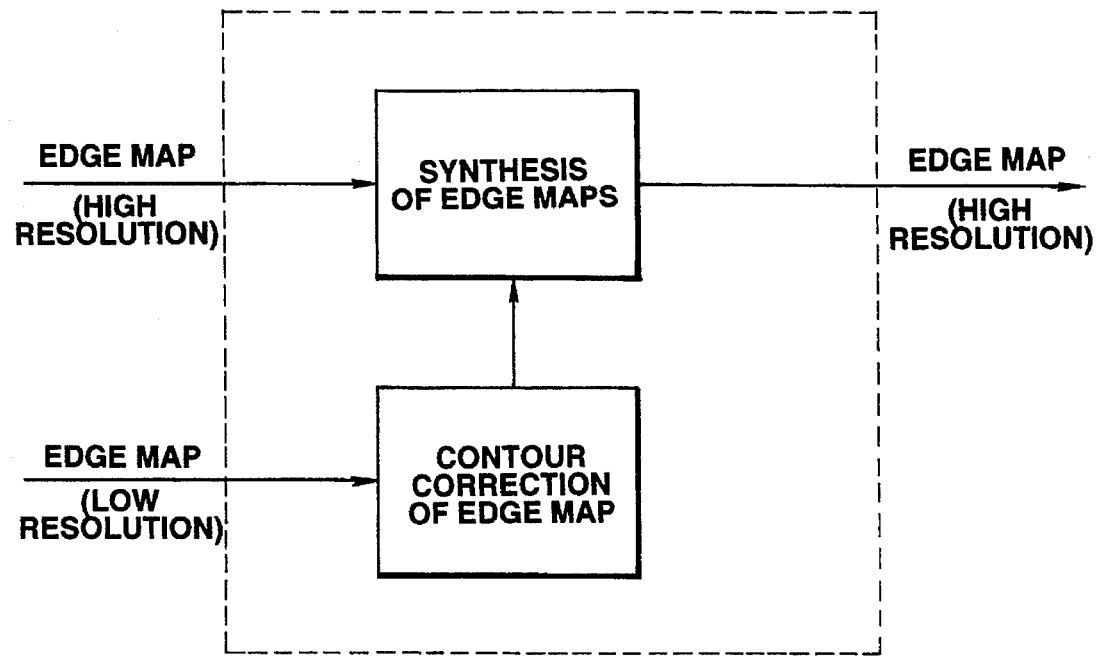
Figure 12:
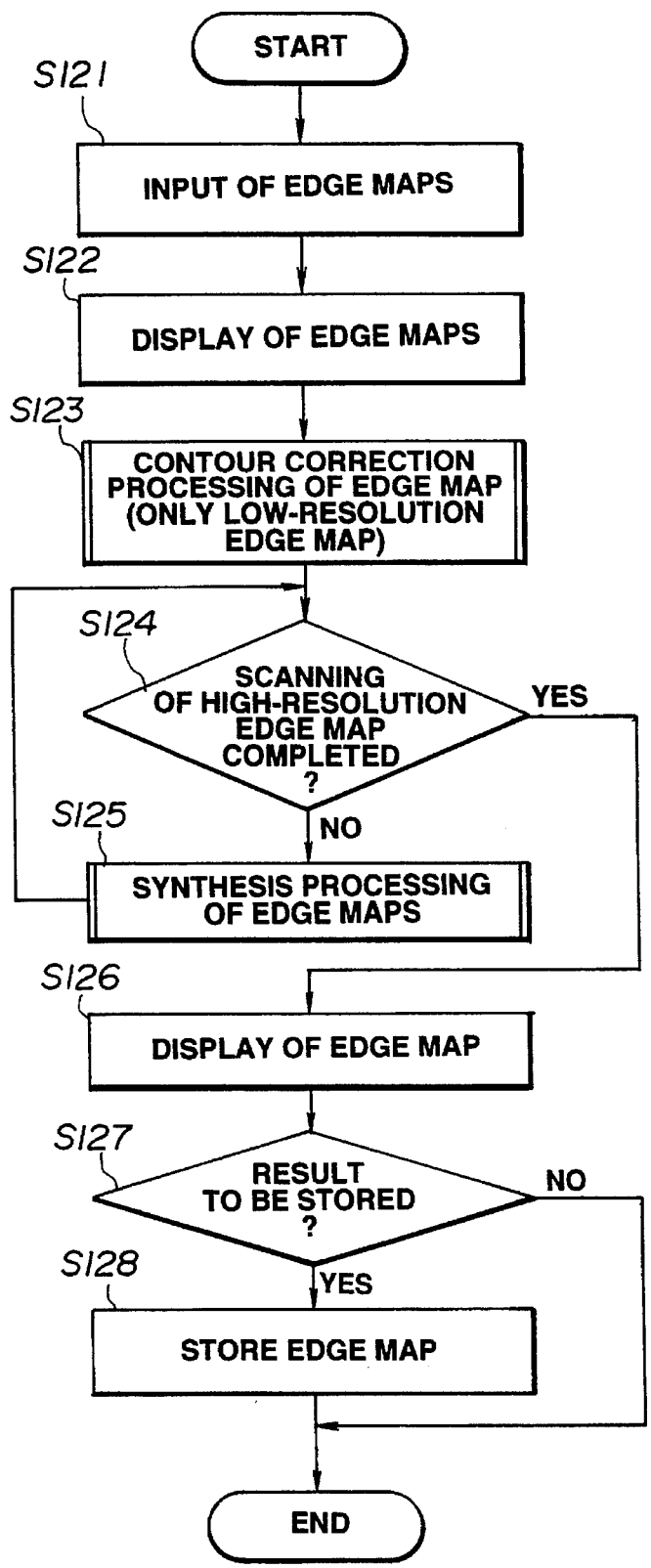
Figure 13:
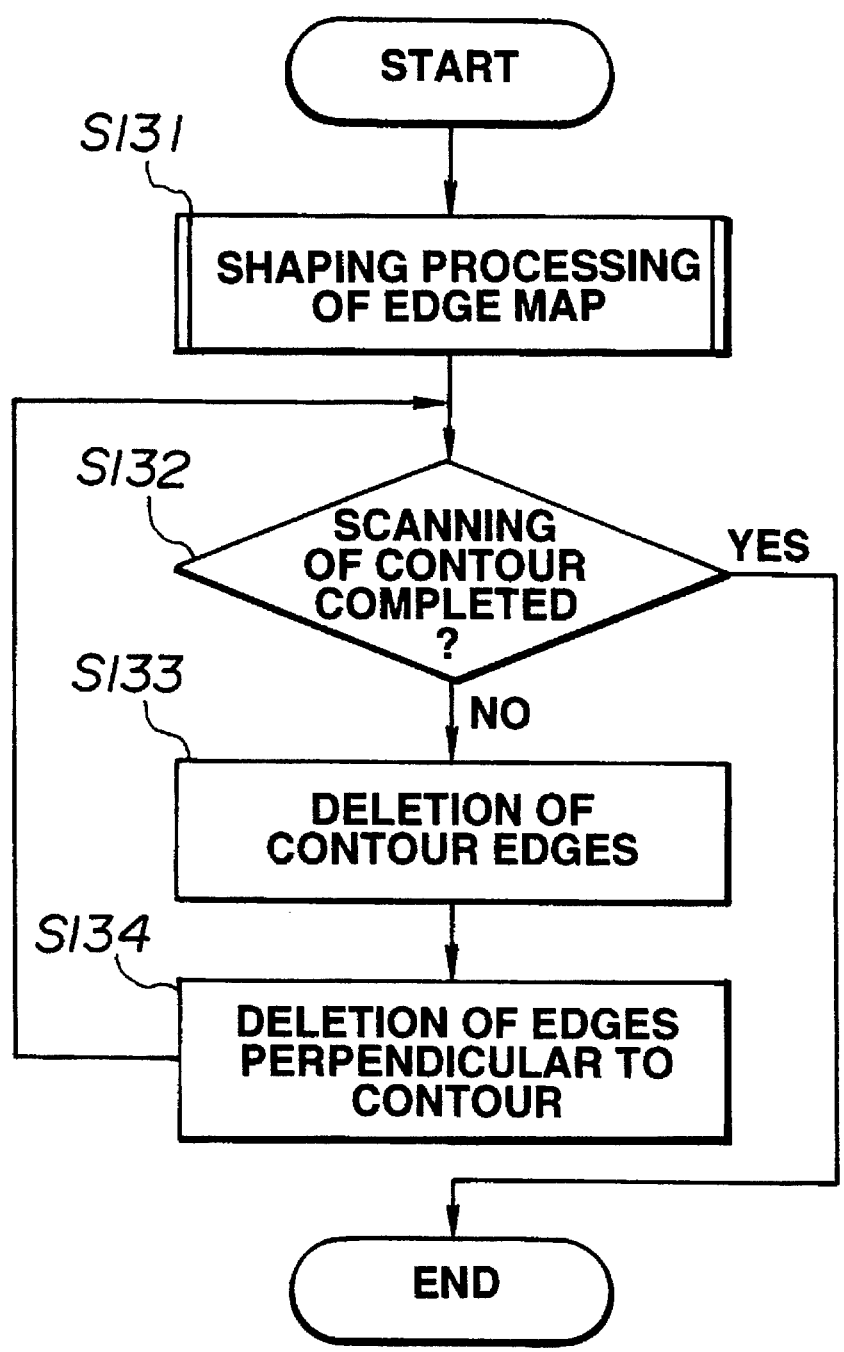
Figure 14:
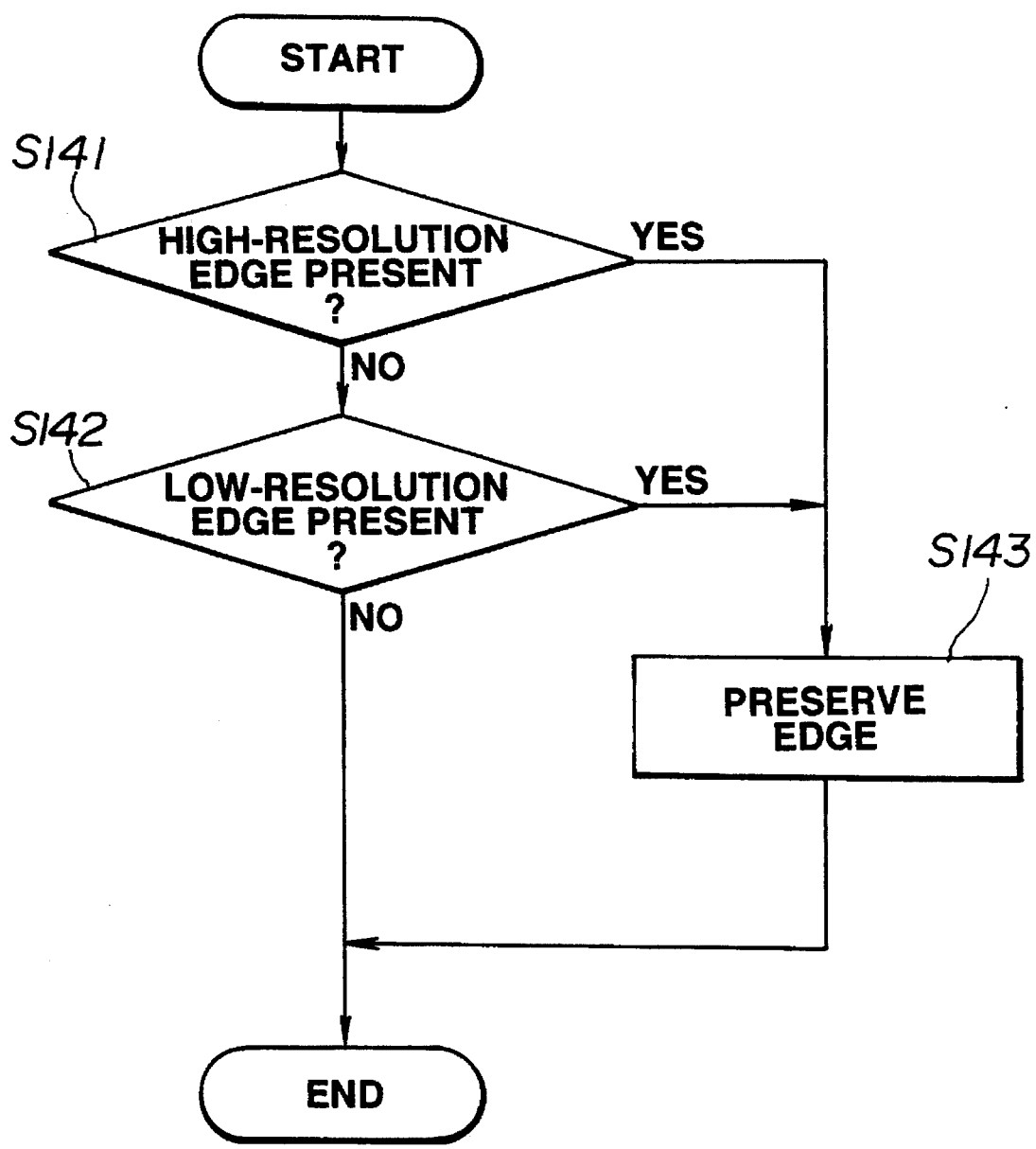
Figure 15A:
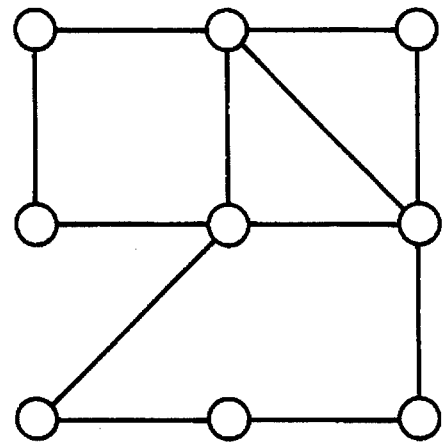
Figure 15B:
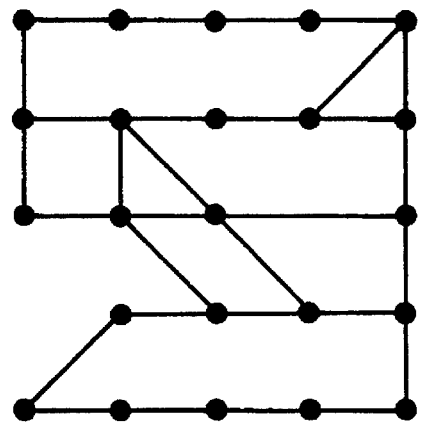
Figure 15C:
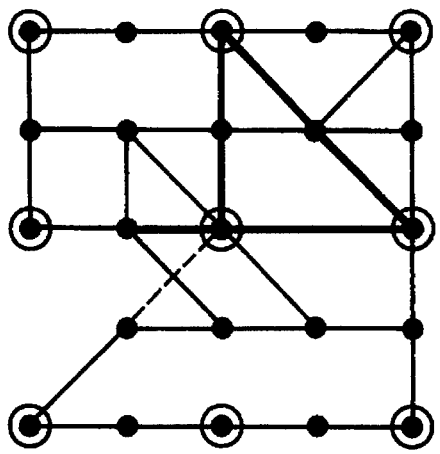
Figure 16C:
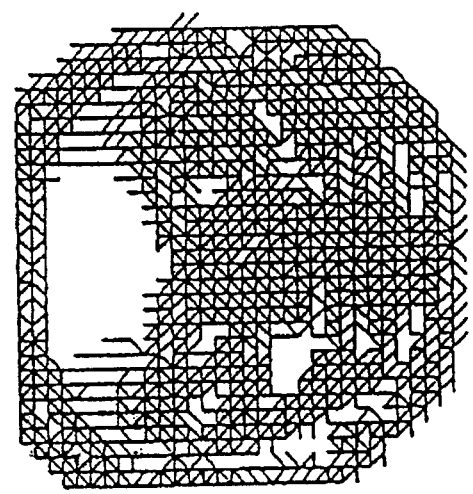
Figure 16B:
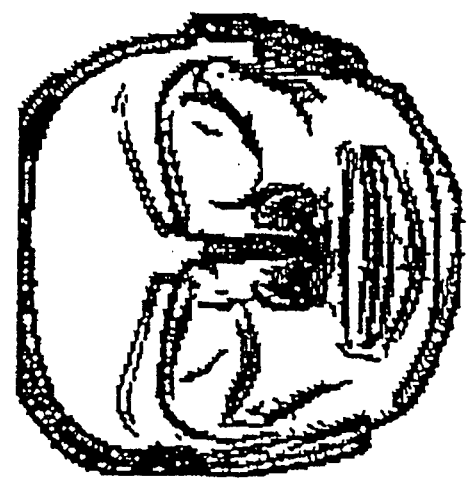
Figure 16A:
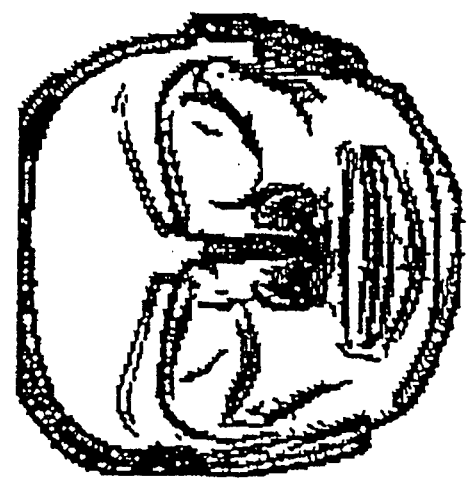
Figure 17:
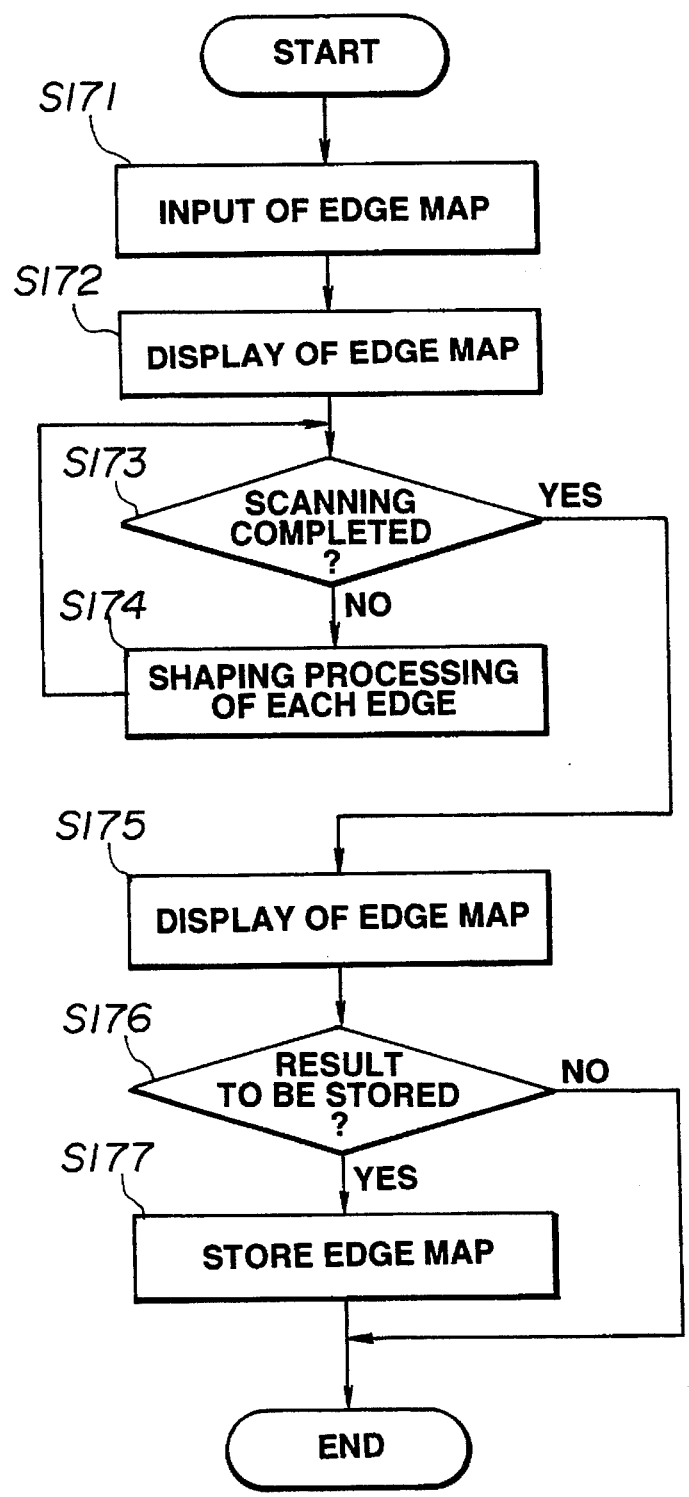
Figure 18:
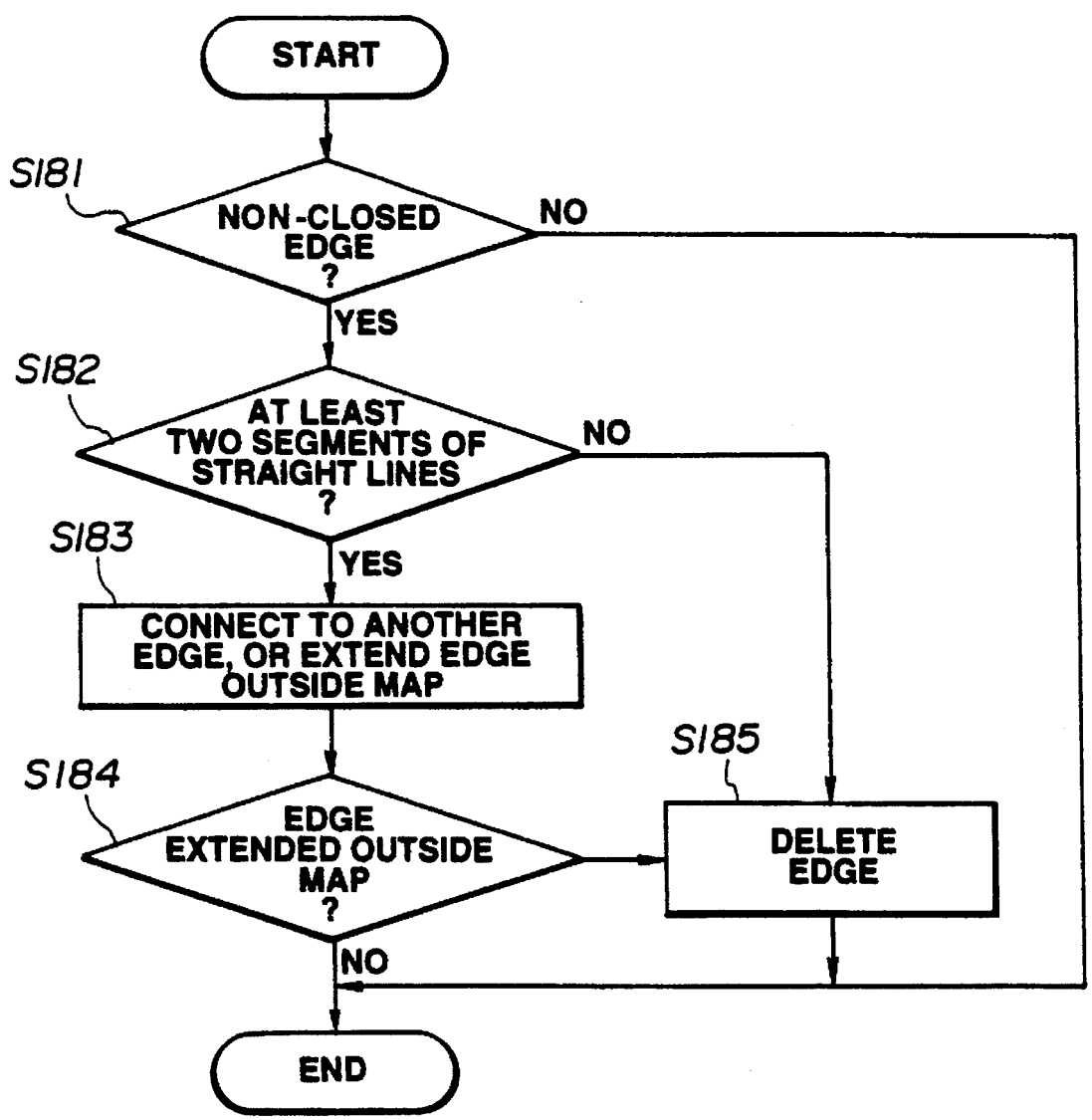
Figure 19A:
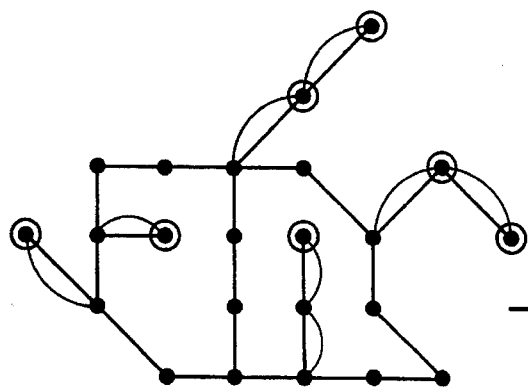
Figure 19B:
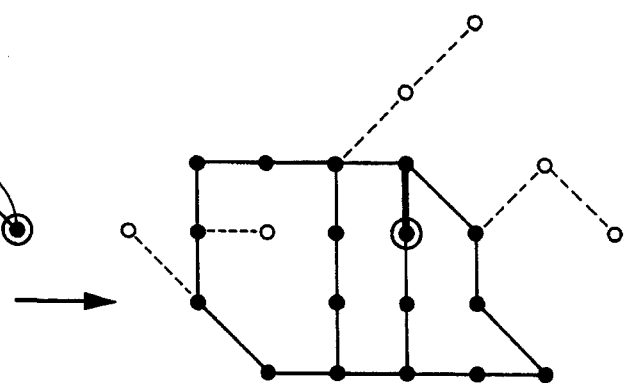
Figure 20A:
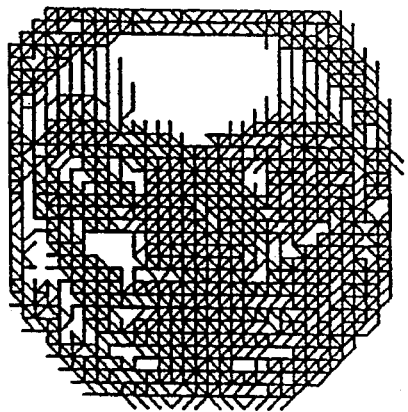
Figure 20B:
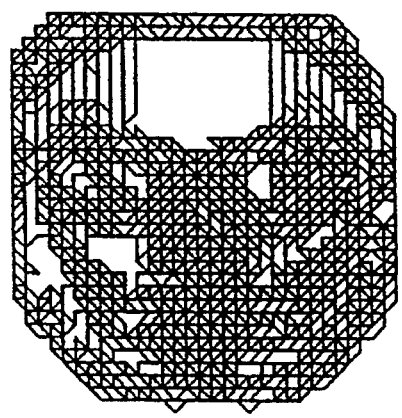
Figure 21:
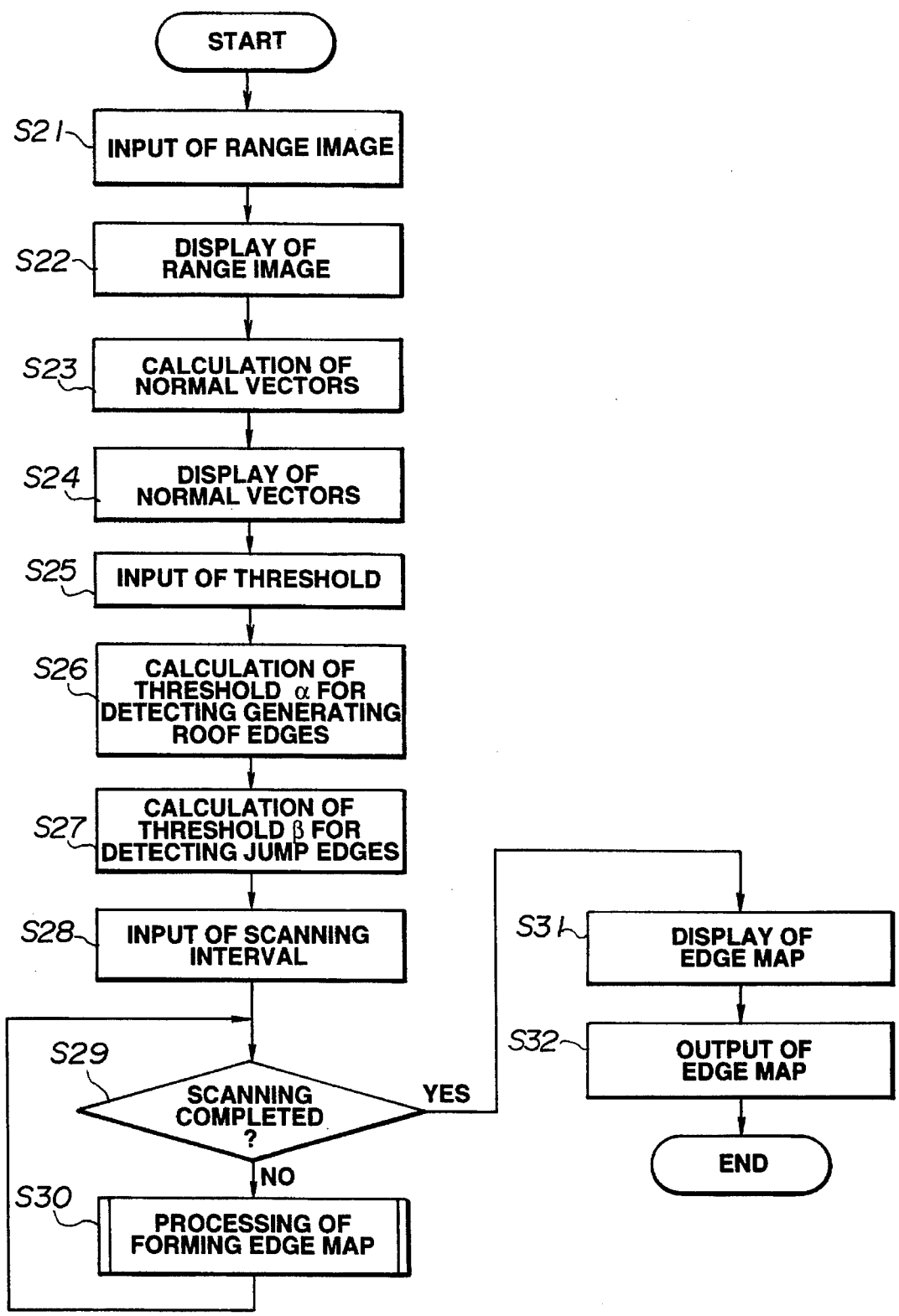
Figure 22:
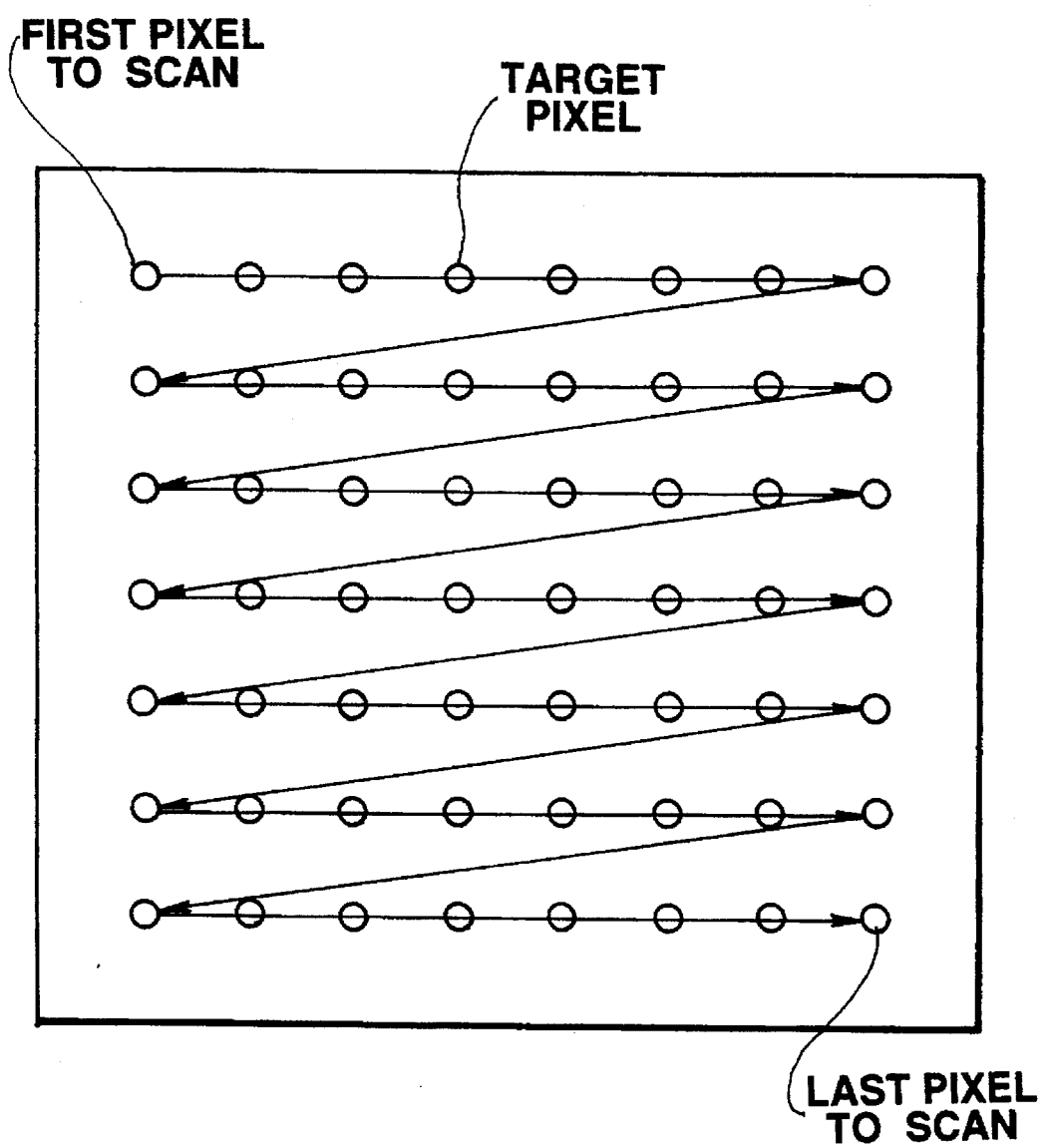
Figure 23:
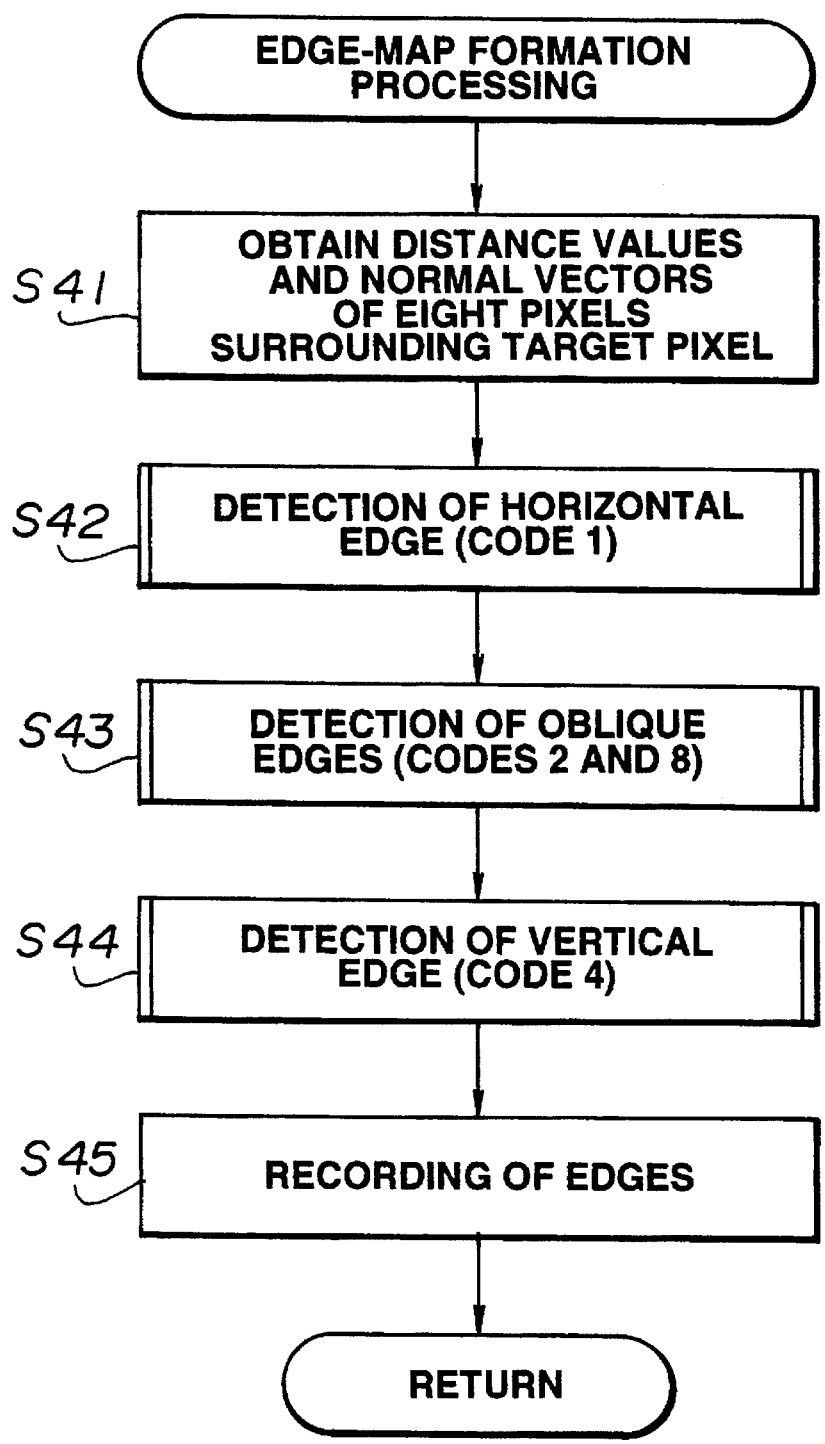
Figure 24:
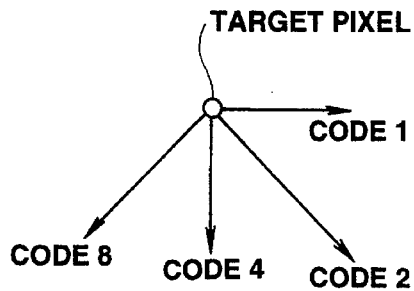
Figure 25:
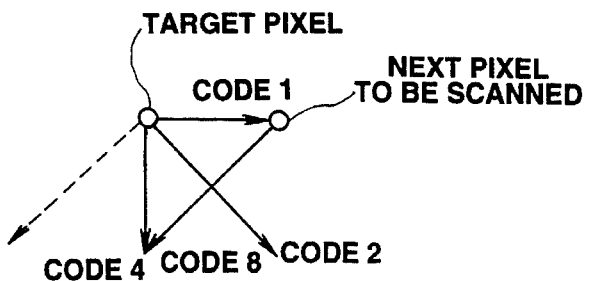
Figure 26:
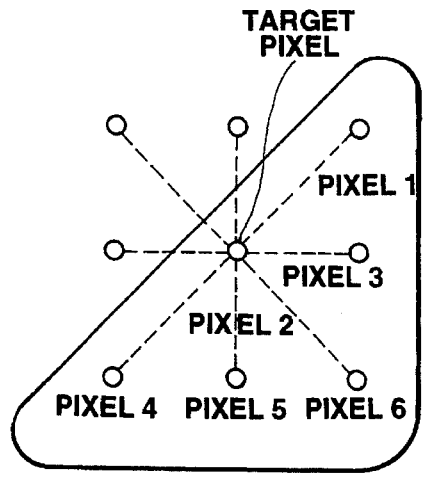
Figure 27:
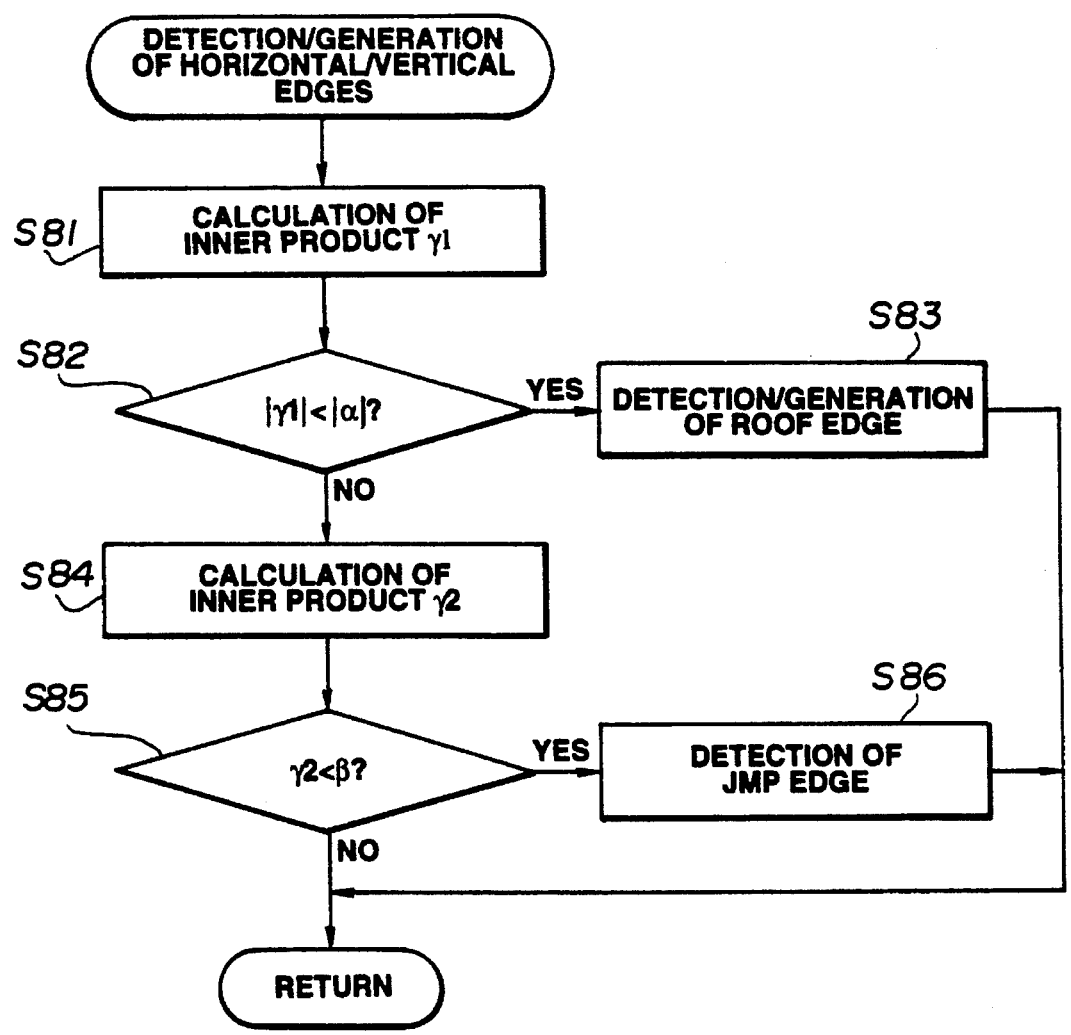
Figure 28:
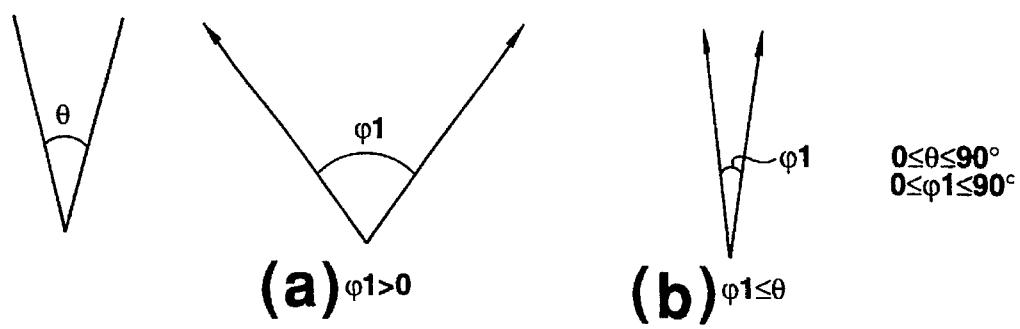
Figure 29:
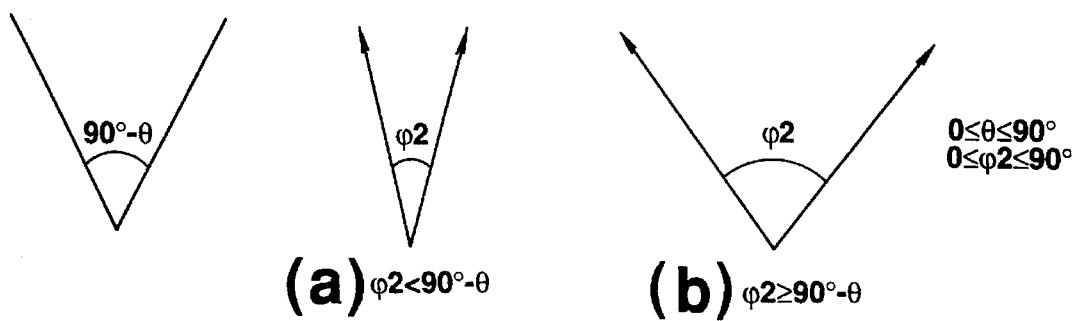
Figure 30:
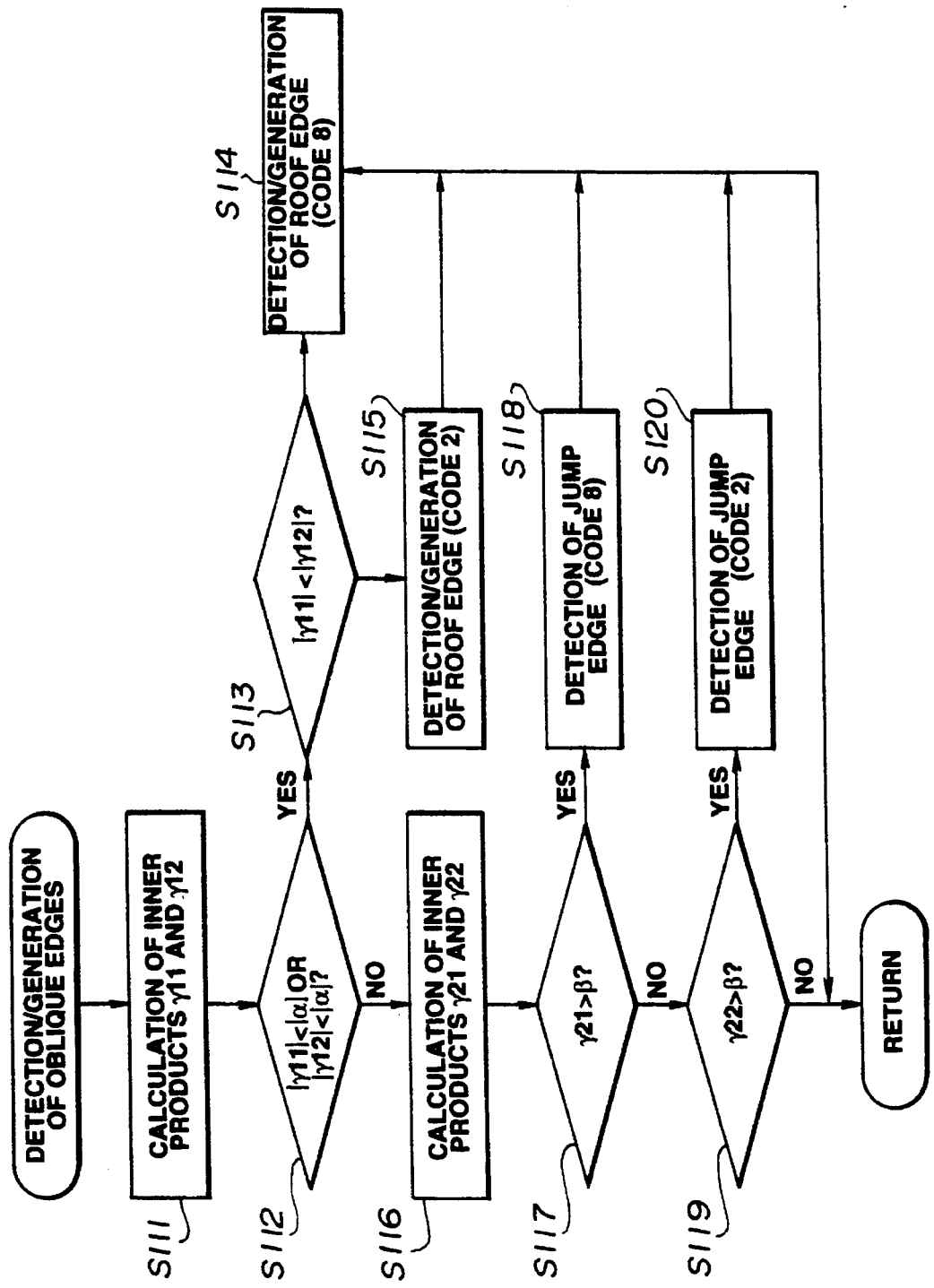
Figure 31B:
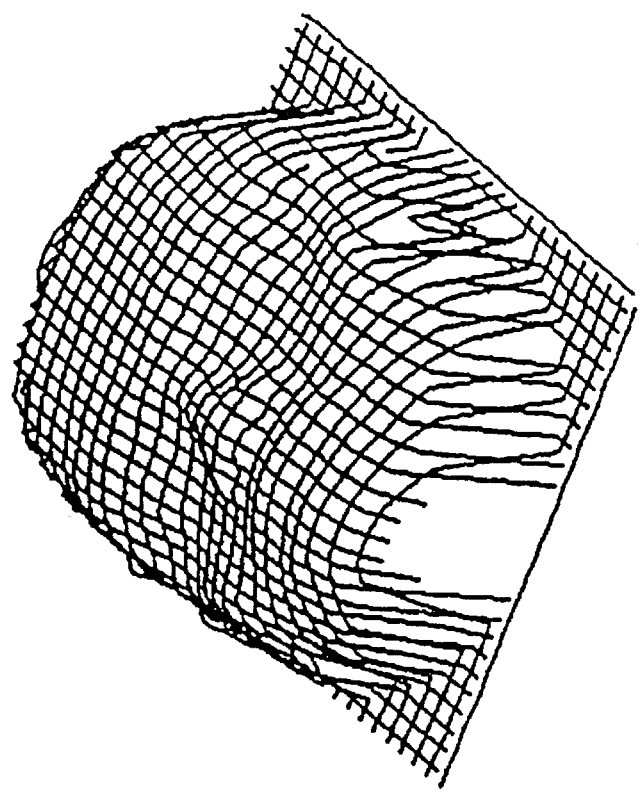
Figure 31A:
Figure 32:
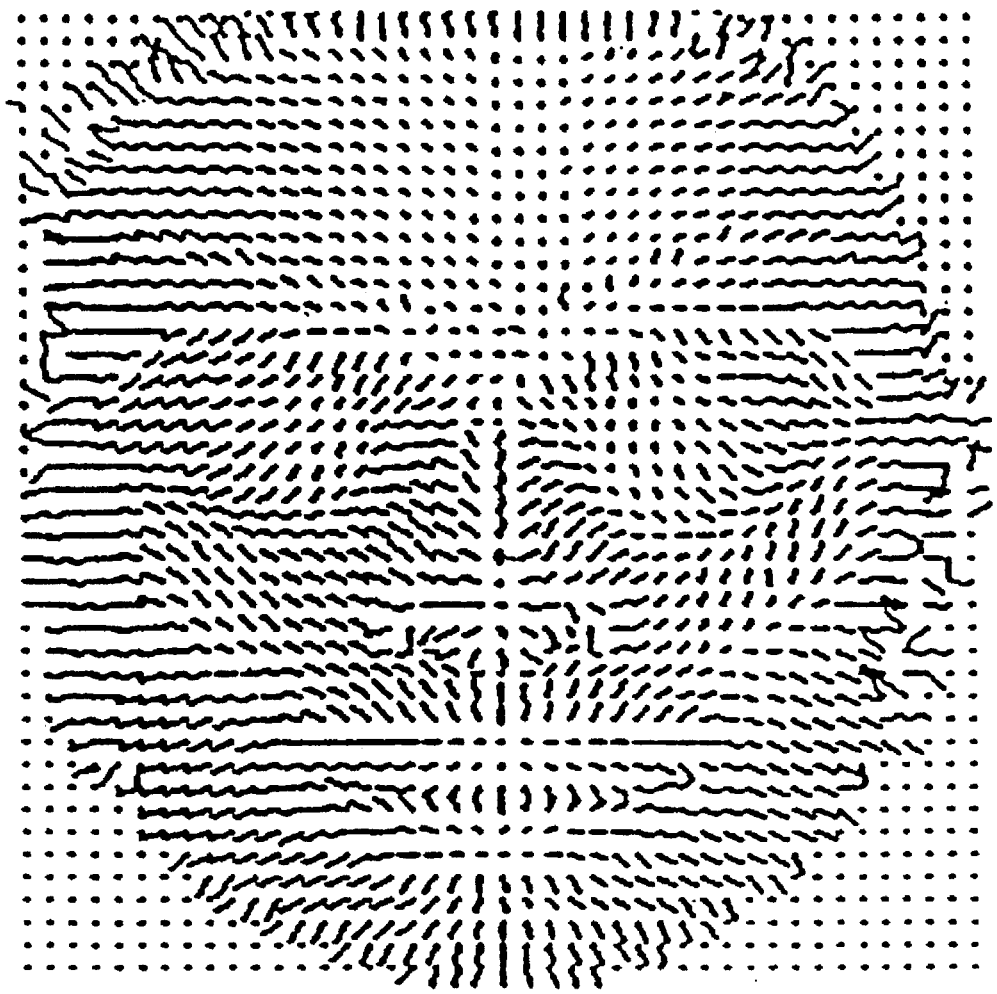
Figure 33A:
Figure 33B:
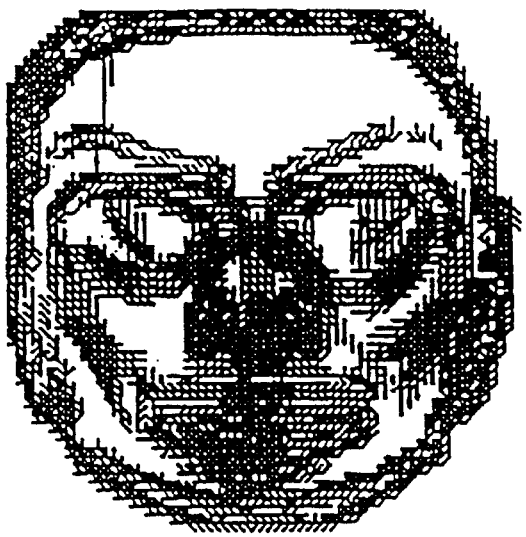
Figure 33C:
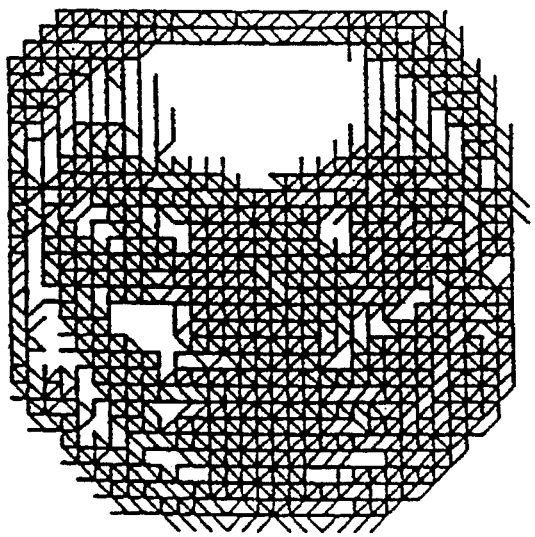
Figure 33D:
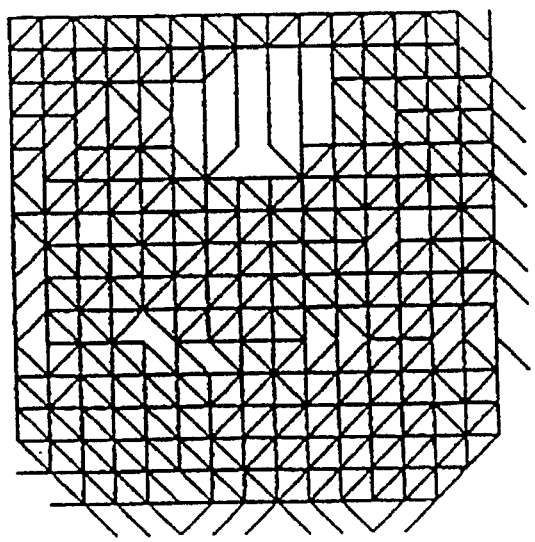

FIGS. 4(a) and 4(b) are diagrams each illustrating a curve obtained by combining three curves;

FIGS. 5(a) through 5(c) are diagrams illustrating a process of generating triangles;

FIGS. 6(a) through 6(d) are diagrams illustrating correction of the three-dimensional coordinates of vertices;

FIG. 7 is a diagram illustrating an example of polygon data;

FIG. 8 illustrates tables, each of which shows a result of comparison between polygon data in the present embodiment and polygon data in a conventional example;

FIG. 9 is a diagram illustrating an input range image;

FIG. 10 is a diagram illustrating a result of reconstruction of an object by formed polygon data;

FIG. 11 is a diagram illustrating the flow of synthesis of edge maps;

FIG. 12 is a flowchart illustrating edge-map synthesis processing;

FIG. 13 is a flowchart illustrating contour correction processing;

FIG. 14 is a flowchart illustrating details of the edge-map synthesis processing;

FIGS. 15(a) through 15(c) are schematic diagrams illustrating the concept of the edge-map synthesis processing;

FIGS. 16(a) through 16(c) are diagrams illustrating results of the edge-map synthesis processing;

FIG. 17 is a flowchart illustrating edge-map shaping processing;

FIG. 18 is a flowchart illustrating details of the edge-map shaping processing;

FIGS. 19(a) and 19(b) are schematic diagrams illustrating the concept of the edge-map shaping processing;

FIGS. 20(a) and 20(b) are diagrams illustrating of the edge-map shaping processing;

FIG. 21 is a flowchart illustrating the flow of the entire processing according to a second embodiment of the present invention;

FIG. 22 is a diagram illustrating the sequence of scanning for performing the processing;

FIG. 23 is a flowchart illustrating the flow of edge-map formation processing;

FIG. 24 is a schematic diagram illustrating the relationship between a target pixel and the direction of each edge to be detected or generated;

FIG. 25 is a diagram illustrating the relationship between a target pixel and the direction of each edge which is actually detected or generated in the present embodiment;

FIG. 26 is a diagram illustrating a target pixel and eight pixels surrounding the target pixel;

FIG. 27 is a flowchart illustrating the flow of the processing of detecting/generating horizontal edges and vertical edges;

FIG. 28 is a diagram illustrating the principle of detecting and generating a roof edge;

FIG. 29 is a diagram illustrating the principle of detecting a jump edge;

FIG. 30 is a flowchart illustrating the flow of the processing of detecting/generating oblique edges;

FIGS. 31(a) and 31(b) are diagrams illustrating different displays of an input range image;

FIG. 32 is a diagram in which normal vectors are displayed; and

FIGS. 33(a) through 33(d) are diagrams in each of which an edge map is displayed.

DESCRIPTION OF THE PREFERRED EMBODIMENTS

Preferred embodiments of the present invention will now be described in detail with reference to the drawings.

Figure 1:
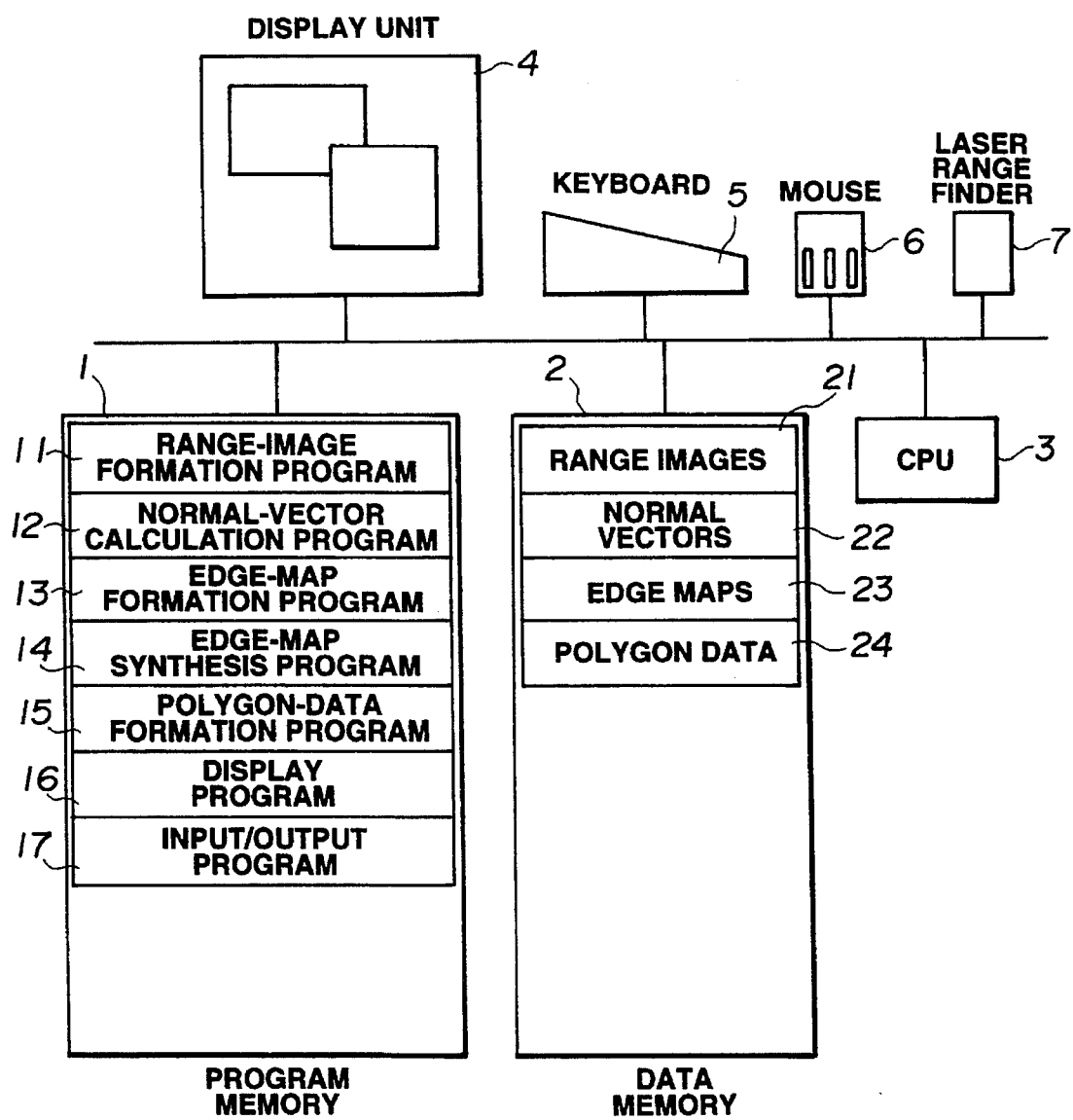
FIG. 1 is a block diagram illustrating the basic configuration of a range-image processing system according to a first embodiment of the present invention.

FIG. 1 is a block diagram illustrating the basic configuration of a range-image processing system according to an embodiment of the present invention.

In FIG. 1, program memory 1 stores various kinds of processing procedures, data memory 2 stores information necessary for processing the system, and input/output data. CPU 3 performs various kinds of processing in accordance with the processing procedures stored in program memory 1, and controls respective units of the system.

Display unit 4 displays various kinds of data, such as shape models based on polygon data obtained in the system, and the like, and performs interactive display of an instruction from the user. Keyboard (KB) 5 is used by the user for forming a program or inputting an instruction to the system. Mouse 6 is used for inputting an instruction on the picture surface of display unit 4. Laser range finder 7 measures the vertical distance between each point on the surface of an object and a reference surface, and inputs a range image. Although in the present embodiment such a range image is input by actually performing measurement, the input method is not limited to such an approach. For example, data stored in an image data base may be utilized.

The present invention can be applied not only to a single apparatus, but also to a system comprising a plurality of apparatuses, provided that the function of the invention can be executed. Furthermore, the present invention can, of course, be applied to a system in which processing is performed by supplying an apparatus or a system with programs.

Program memory 1 stores a range-image formation program 11 for forming a plurality of range images having different resolutions from a range image, a normal-vector calculation program 12 for calculating normal vectors for respective points on a range image from the range image, and an edge-map formation program 13 for forming an edge map by detecting and generating edges of the corresponding object from a range image and normal vectors. Program memory 1 also stores an edge-map synthesis program 14 for forming a single edge map by synthesizing a plurality of edge maps having different resolutions, a polygon-data formation program 15 for forming polygon data from an edge map, a display program 16 for displaying a range image, normal vectors and edge maps, and an input/output program 17 for performing input/output of data.

Data memory 2 stores range images 21 input from laser range finder 7, a range-image data base and the like, or generated based on range-image formation program 11, normal vectors 22 calculated from each range image 21, edge maps 23 formed based on edge-map formation program 13, and polygon data 24 formed from polygon-data formation program 15.

Figure 2:
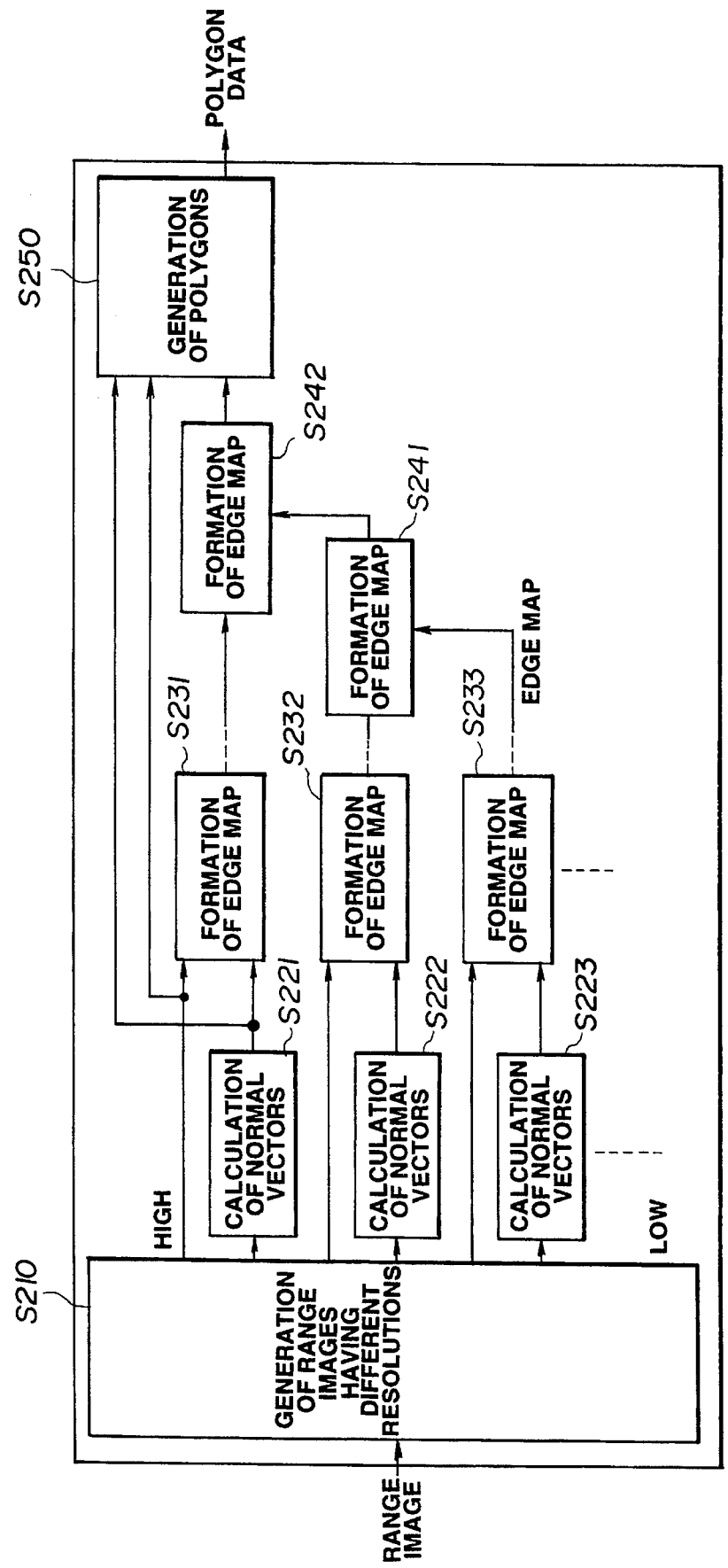
FIG. 2 is a diagram illustrating the flow of the processing of the first embodiment.

FIG. 2 illustrates the flow of the processing of the present embodiment. In FIG. 2, each arrow indicates the direction of the flow of data. In the present embodiment, first, a plurality of range images having different resolutions are formed from an input range image (step S210). At that time, resolutions of range images to be formed are determined by checking the shape of the object represented by the input range image. In general, many range images having different resolutions are needed for an object whose surface has a complicated shape and which is configured by curved surfaces having various curvatures. On the other hand, a range image having a single resolution suffices for an object which is configured only by planes. For forming a plurality of range images having different resolutions, the original range image is basically assumed to be a range image having the highest resolution, and range images having lower resolutions are formed by smoothing the original range image or skipping part of the original range image. Range images having different resolutions are formed by changing the range of the smoothing operation or changing the interval for the skipping operation.

Figure 3:
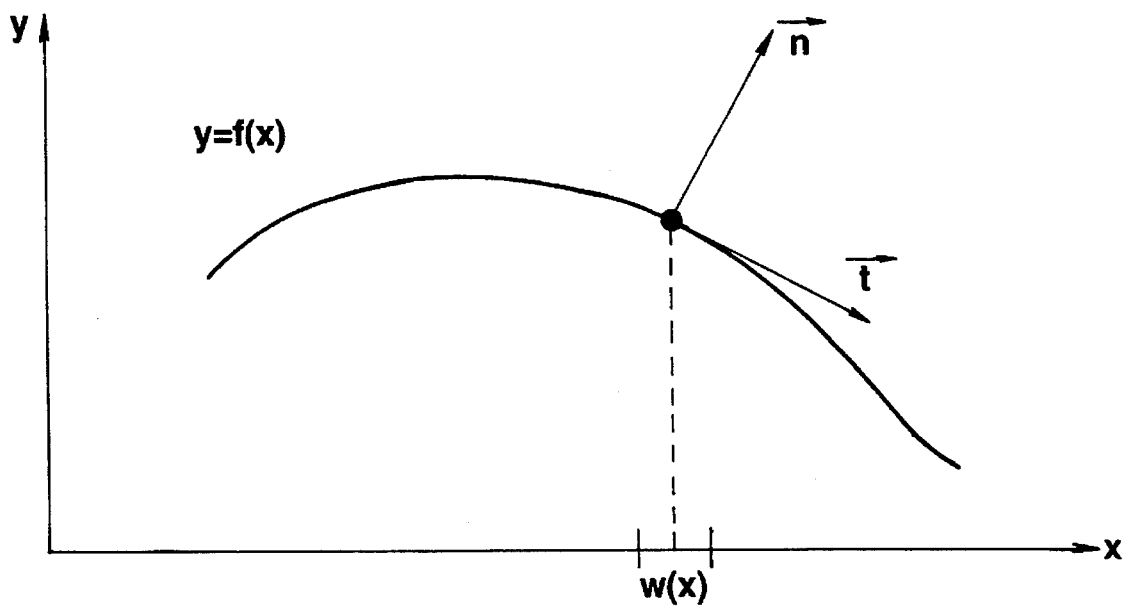
FIG. 3 is a diagram illustrating the relationship between gradient and resolution.

A description will be provided of the relationship between the curvature and the gradient of a curved surface, and the interval between sampling points in the range image illustrating a curve within a two-dimensional plane. As shown in FIG. 3, a curve y=f(x) within a two-dimensional plane will be considered. Tangent vector t and normal vector n on a point on the curve are expressed by:

$$t=(1, dy/dx), \text{ and } n=(-dy/dx, 1).$$

Angle $\phi$ made by n with respect to the positive direction of the x axis is expressed by:

$$\phi=\tan^{-1}(-1/dy/dx) \quad (0 \leq \phi \leq \pi) \quad (1)$$

The derivative $d\phi/dx$ of $\phi$ expressed by expression (1) with respect to x is expressed by:

$$d\phi/dx=(d^2y/dx^2)/\{1+(dy/dx)^2\} \quad (21)$$

When a minute width w(x) is provided in the x-axis direction, the angular difference $\theta(x)$ between normal vectors produced at the two end points of the width w(x) is 10 expressed by:

$$\theta(x)=|d\phi/dx|w(x) \quad (3)$$

Since the curvature of the curve y = f(x) is expressed by:

$$k(x)=|dy/dx|/\{1+(dy/dx)^2\}^{3/2} \quad (4)$$

the following relational expression is obtained by substituting expressions (4) and (2) for expression (3):

$$w(x) = \{\theta(x)/k(x)\}\{1/\sqrt{1+(dy/dx)^2}\}. \quad (5)$$

That is, the interval between two points which causes the angular difference $\theta(x)$ between normal vectors is given by the above-described expression w(x) which is the function of the curvature k(x) and the gradient of the curve.

The above-described relational expression (5) between the interval w(x) between sampling points on the curve y=f(x), and the angular difference $\theta(x)$ between normal vectors produced at these points will be modified as follows:

$$w(x)=\theta(x)\{1+(dy/dx)^2\}/|d^2y/dx^2| \quad (6)$$

The following expression represents a curve which satisfies expression (6):

$$y=f(x)=-k \cdot \log|\cos(x/k)|+C \quad (7)$$

where k=w0/θt.

The curve shown in FIG. 4(a) is obtained by combining three curves in sections A, B and C having widths w1, w2 and w3 (w1<w2<w3), respectively, as value w0 in expression (7). The angular difference between normal vectors produced at two end points of each section equals a constant value θt. FIG. 4(b) illustrates the curvature of the curve shown in FIG. 4(a). If a low-pass filter which passes curvature components having values smaller than the curvature k1 and cuts curvature components having values greater than the curvature k1 is used, only the curve of section C can be preserved. If the interval w3 between sampling points is adopted for this result, the angular difference between normal vectors produced at two end points of the interval equals θt.

If a low-pass filter which passes curvature components having values smaller than the curvature k2 and cuts curvature components having values greater than the curvature k2 is used, the two curves of sections B and C can be preserved. If normal vectors are obtained for this result with the interval w2 between sampling points, the angular difference between normal vectors becomes less than θt since w2<w3 in section C, and edge lines are not detected when the value θt is made to be the threshold for detecting edge lines. If the interval w2 between sampling points is adopted in section B, the angular difference between normal vectors produced at the two end points of this section equals θt.

If normal vectors are obtained with the interval w1 between sampling points for the original curve, the angular difference between normal vectors becomes less than θt since w1<w2<w3 in sections B and C, and edge lines are not detected when the value θt is made to be the threshold for detecting edge lines. If the interval w1 between sampling points is adopted in section A, the angular difference between normal vectors produced at the two end points of this section equals θt.

A Gaussian filter expressed by the following expression can be used as a low-pass filter for removing noise in the input range image and generating a plurality of range images having different resolutions including curvature components within an assigned range.

$$G(x, y) = (1/2\pi\sigma_f^2) \exp\{-(x^2+y^2)/2\sigma_f^2\} \quad (8)$$

Parameter σ in the above-described expression is selected to be $\sigma = T/\sigma_f = 2 \cdot (2s) = 4s$ in order to remove high-frequency noise in the input range image, and curvature components having values smaller than the above-described interval w0 (set to value 2s) between pixels, where T is the diameter of a Gaussian window.

Next, normal vectors are calcuated for respective obtained range images having different resolutions (steps S221–S223).

When the above-described Gaussian filter is used, normal vector n at each point is obtained by convoluting partial differentials of the above-described expression G(x, y) in the x and y directions with range image Z(x, y), and is expressed by the following expression:

$$n(x,y) = \{(\partial G/\partial x) * Z, (\partial G/\partial y) * Z, -1\} \quad (9)$$

Then, edge maps are formed from respective range images having the corresponding resolutions and normal vectors obtained by the above-described expression (steps S231–S233). In each of these steps, as will be described later in another embodiment of the present invention, edges, where the distance between a target pixel and eight surrounding pixels exceeds a threshold, and the angular difference of normal vectors exceeds a threshold, are found. In each edge map, the directions where edges are present as seen from each pixel are indicated.

The calculation of normal vectors and the formation of an edge map are performed independently for each image having the corresponding resolution. Hence, the processing can be efficiently performed by configuring the system as a multiprocessor system and allocating the operation for each image to each corresponding processor.

The edge maps having different resolutions obtained in the above-described manner are sequentially synthesized from edge maps having lower resolutions, and finally a single edge map is obtained (steps S241–S242). In each synthesizing operation, the resolution of a synthesized edge map equals a higher resolution of two synthesized edge maps, and the resolution of the final edge map equals the highest resolution. At the same time, the final edge map has characteristics possessed by all the edge maps having different resolutions. The details of these steps will be described later.

Polygon data are formed from the final synthesized edge map (step S250).

A polygon having a complicated shape obtained in the above-described procedures (steps S241–S242) is divided into a set of triangles each of which is guaranteed to be present on the same plane in the three-dimensional space. In the present embodiment, the polygon is first divided into a plurality of convex polygons, and each convex polygon is further divided into triangles. For that purpose, as shown in FIG. 5(a), concave points are detected by tracing the contour lines of the polygon, and an edge line is extended toward the opposite side. Thus, as shown in FIG. 5(b), all divided polygons have convex vertices. Each of the divided polygons is further divided into triangles. As shown in FIG. 5(c), an edge-line map including divided triangles is obtained by extending an edge line from each upper-left vertex to another vertex separated from the upper-left vertex. The angle difference between normal vectors included in each of the triangles equals at most θt.

Figure 6A:
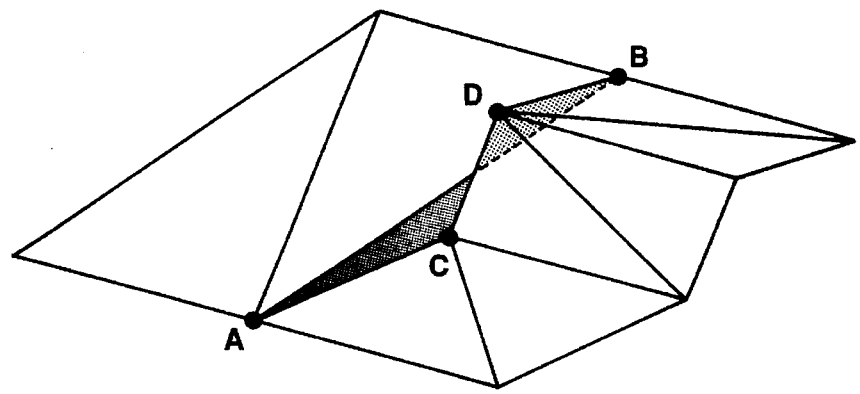
Figure 6B:
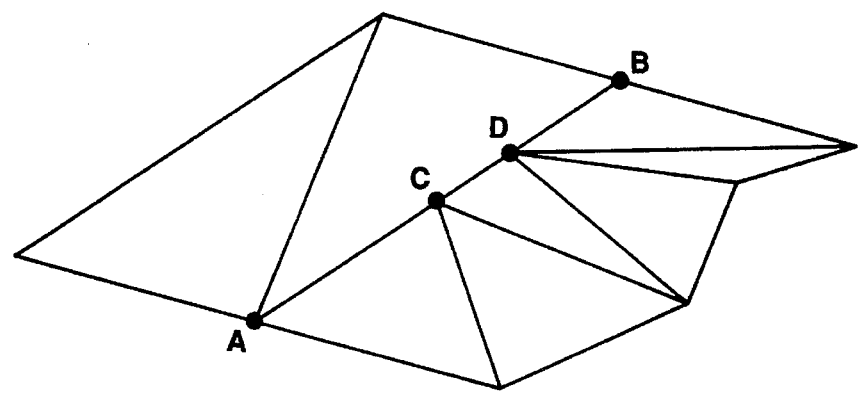

Next, triangular patches in the three-dimensional space are formed from the edge map in the two-dimensional image. First, the above-described edge map having divided triangles is scanned, and inflection points at each of which the direction of the edge line changes, and points at each of which two edge lines are connected are sequentially found. Then, by referring to the value of the range image corresponding to the coordinate value of each point, the coordinates of each vertex of the triangle patch are read. In this embodiment, range-image data having the highest resolution are utilized. At that time, as shown in FIG. 6(a) due to an error in the measurement of the range image, or the like, a three-dimensional gap may, in some cases, be produced on the surface of the reconfigured object at a position where triangles having different sizes are connected. In order to overcome such a problem, vertices at each point in which edge lines in two directions are connected in the form of a T on the edge-line map are found, and the distance values for these vertices are corrected using the following expressions as shown in FIG. 6(b):

$$zC = \{(xC-xA)(zB-ZA)\}/(xB-xA)+zA$$

(when xA≠xB), $$zC = \{(yC-yA)(zB-zA)\}/(yB-yA)+ZA$$

(when xA=xB), where the three-dimensional coordinates of points A, B and C are represented by (XA,yA,ZA), (XB,yB,ZB) and (xc,yc, xc).

Figure 6C:
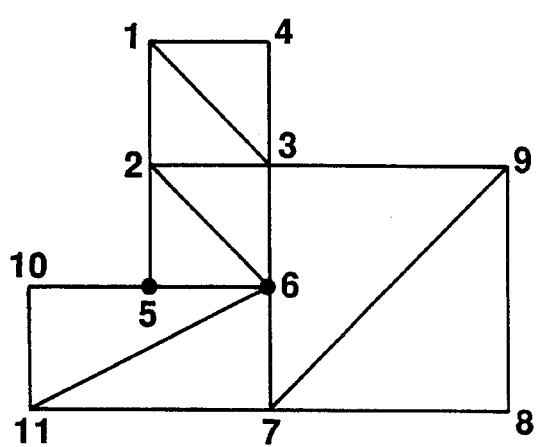
Figure 6D:
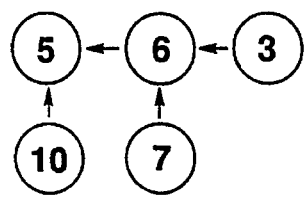

The sequence of vertices whose coordinates are to be corrected is obtained by analyzing strong-connection components in a directed graph indicating the dependence of the vertices to be corrected. FIG. 6(c) illustrates a simple example. In FIG. 6(c), since each of vertices 5 and 8 has edge lines connected in the form of a T, the three-dimensional coordinates of these vertices must be corrected. FIG. 6(d) is a directed graph indicating the dependence in correction for the found vertices having edge lines connected in the form of a T and vertices adjacent thereto, and indicates that correction must be started from the vertex corresponding to a leaf in the graph. In this case, vertices 3, 7 and 10 are vertices whose coordinate values are already fixed, and correction is performed in the sequence of vertices 6 and 5.

In addition to the coordinate values of vertices of triangular patches formed in the above-described manner, normal-vector information of each of the calculated vertices is read, and a data file expressed in the form of trianguler patches is formed. FIG. 7 illustrates an example of the data file.

FIG. 8 shows results of forming polygon data from the same range image according to the present embodiment and a conventional approach. The volume error is calculated by the following expression. The unit of the volume error is %. FIG. 9 illustrates the original range image used in the experiment. FIG. 10 is a computer graphics (CG) illustrating a result obtained by reconfiguring the object using polygon data formed from the range image according to the present embodiment.

The actual volume of the object: V
The volume of the object reconfigured by polygons: A
The volume difference: B=|V−A|
The volume error: B/A×100

As can be understood from FIG. 8, according to the present embodiment, it is possible to reduce the number of polygons in the same resolution while maintaining at least the same image quality. By storing polygon data obtained in the above-described manner in data memory 2 by an instruction of the user, it is possible to utilize the polygon data in CG or the like.

Next, the details of the synthesis of edge maps will be described.

FIG. 11 is a diagram illustrating the flow of edge-map synthesis processing.

FIG. 12 is a flowchart of edge-map synthesis processing. FIG. 13 is a flowchart illustrating the flow of contour correction processing of an edge map. FIG. 14 is a flowchart illustrating a detailed flow of the edge-map synthesis processing. FIGS. 15(a) through 15(c) are schematic diagrams illustrating the concept of the edge-map synthesis processing; FIGS. 15(a) and 15(b) are low-resolution and high-resolution edge maps before the processing, respectively, and FIG. 15(c) is a diagram illustrating the state of the edge map after the processing.

A description will be provided of the processing of synthesizing two edge maps having different resolutions with reference to the flowchart shown in FIG. 12. First, two edge maps to be processed are taken out from data memory 2 (step S121), and are displayed on display unit 4 (step S122). Then, contour correction processing of the low-resolution edge map is performed (step S123). Thereafter, the high-resolution edge map is scanned, and synthesis processing is performed for each edge until the scanning is completed (steps S124–S125). When the scanning has been completed, the synthesized edge map is displayed on display unit 4 (step S126). After being confirmed by the user through keyboard 5 or the like (step S127), the synthesized edge map is stored in data memory 2 (Step S128) and the process is terminated. Whenever necessary, the result of the processing may not be directly stored in data memory 2, but may be stored in data memory 2 after performing the processing of shaping non-closed edges in the edge map (to be described with reference to FIGS. 17 through 20(b)).

The contour correction processing of the edge map in step S123 is the processing of removing edges corresponding to the contour of the object in the edge map. In general, the contour of a high-resolution edge map is more precise than the contour of a low-resolution edge map, and edges in the low-resolution edge map are often generated outside the actual contour. Hence, if these edge maps are simply synthesized, the contour of the high-resolution edge map having high precision is, in some cases, covered with the contour of the low-resolution edge map. Accordingly, by previously removing the contour of the low-resolution edge map, the contour of the high-resolution edge map can be protected in synthesis processing. However, if all edges corresponding to the contour are removed, too much information will, in some cases, be lost. Hence, in the present embodiment, some of the edges are preserved.

A description will be provided of the contour correction processing with reference to FIG. 13. First, shaping processing of making all edges in the edge map to be in a closed state is performed (step S131). This shaping processing will be described later. Next, the contour in the edge map is scanned, and edges corresponding to the contour and edges perpendicular to the contour are deleted (steps S132–S134).

Referring again to FIG. 12, the edge synthesis processing in step S125 will be described in detail with reference to FIG. 14. In this processing, the high-resolution edge map is scanned, and the logical sum of the high-resolution and low-resolution edge maps is obtained. More specifically, in order to preserve detailed-portion information of the surface shape of the high-resolution edge map, a high-resolution edge is preserved if it is present (steps S141 and S143), and a low-resolution edge is preserved if it is present while a high-resolution edge is absent (steps S142 and S143). If a high-resolution edge is inconsistent with the corresponding low-resolution edge, priority is given to the high-resolution edge, as shown in FIGS. 15(a) through 15(c). In the present embodiment, the interval between sampling pixels of the low-resolution edge map is an integer multiple of that of the high-resolution edge map. The resolution of the synthesized edge map equals the resolution of the higher-resolution edge map of two edge maps to be synthesized.

FIGS. 16(a) through 16(c) illustrate examples of the edge-map synthesis processing according to the present embodiment. FIG. 16(a) illustrates an input low-resolution edge map, FIG. 16(b) illustrates an input high-resolution edge map, and FIG. 16(c) illustrates a result of synthesizing the two edge maps by the above-described processing.

Next, a description will be provided of edge-map shaping processing with reference to FIGS. 17 through 20(b).

FIG. 17 is a flowchart illustrating the flow of the processing. FIG. 18 is a flowchart illustrating the details of edge-map shaping processing. FIGS. 19(a) through 20(b) are schematic diagrams illustrating the concept of the edge-map shaping processing; FIGS. 19(a) and 20(a) illustrate the states of edge maps before the processing, and FIGS. 19(b) and 20(b) illustrate the states of edge maps after the processing.

Referring to FIG. 17, first, the edge map to be processed is taken out from data memory 2 (step S171), and is displayed on display unit 4 (step S172). The edge map is then scanned. Until the scanning is completed (step S173), each edge is subjected to shaping processing (step S174). When the scanning has been completed, the edge map is displayed on display unit 4 (step S175). After being confirmed by the user through the keyboard 5 or the like (step S176), the edge map is stored in data memory 2 (step S177), and the process is terminated.

The edge shaping processing will be described in detail with reference to FIG. 18. First, it is checked if the scanned edge is a non-closed edge (step S181). A non-closed edge is an edge indicated by a circular arc in FIG. 19(a). One circular arc represents a unit of edge. When a non-closed edge has been found, the shape of the edge is checked (step S182). If the edge comprises at least two segments of straight lines, the edge is connected to another edge, or is extended until it goes outside the map (step S183). If the edge goes outside the map by being extended, both the extended portion and the original straight-line portion are deleted (steps S184 and S185). Also when the edge does not comprise at least two segments of straight lines in the check of step S182, the edge is deleted. As a result, the non-closed edge is deleted, or extended so as to be connected to another edge to form a closed edge. In FIG. 19(b), edges indicated by broken lines are deleted edges, and an edge indicated by a thick line is an extended edge.

Although in the present embodiment whether a non-closed edge must be deleted or extended is determined from the shape of the edge, the determination may be performed from the relationship with surrounding edges.

FIGS. 20(a) and 20(b) illustrate an example of the processing according to the present embodiment; FIG. 20(a) illustrates the state of an edge map before the processing, and FIG. 20(b) illustrates the state of the edge map after the processing.

Second Embodiment

In a second embodiment of the present invention, the scanning interval for detecting edges is variable. The amount of data is reduced by increasing the interval in accordance with the shape of an object or the object of utilization of data.

The flow of the entire processing will be described with reference to FIG. 21.

First, a range image stored in data memory 2 is taken out (step S21), and displayed on display unit 4 (step S22). Thereafter, a unit normal vector is calculated for each pixel of the range image (step S23), and displayed on display unit 4 (step S24). At that time, whenever necessary, the calculated unit normal vectors are stored in data memory 2. Thereafter, the threshold θ (deg) for detecting edges is input from keyboard 5 (step S25). The threshold α for detecting roof edges is calculated by:

$$\alpha = \cos\theta$$

and the threshold β for detecting jump edges is calculated by:

$$\beta = \cos(90° - \theta) \quad \text{(steps S26 and S27)}$$

Thereafter, as shown in FIG. 22, the processing is performed by scanning respective pixels of the range image in the sequence of from the left to the right, and from above to below. Before starting the scanning, the scanning interval is input from keyboard 5 (step S28). This scanning interval depends on the shape of the object and edges to be detected. It is possible to previously store the relationship between the scanning interval, and the shape of the object and edges to be detected in a memory in the form of a table or a relational expression, and to determine the scanning interval based on the stored data. The minimum unit of the scanning interval equals one pixel. While determining if a pixel to be scanned is present (step S29), edge detection/generation processing (step S30) is repeated until no pixel to be scanned is present. After the completion of the scanning, the edge map is displayed on display unit 4 (step S31), and is stored in data memory 2 (step S32), and the process is terminated.

Next, the detailed procedure of the edge detection/generation processing in step S30 shown in FIG. 21 will be described with reference to FIG. 23.

First, as shown in FIG. 26, the distance values between the target pixel and five pixels from among eight pixels surrounding the target pixel, and unit normal vectors of the five pixels are read (step S41). Thereafter, as shown in FIG. 24, edges in respective directions are detected or generated. Although there is no particular significance in the sequence of the processing, in the present embodiment, the processing is performed in the sequence of the horizontal edge (code 1), the oblique edges (codes 2 and 8), and the vertical edge (code 4) (steps S42, S43 and S44). Finally, the states of edges present around the target edge are stored in edge-map storage region 23 (step S45). Edge-map storage region 23 stores each edge possesed by each pixel as a chain code in the form of the logical sum of code values, that is, directions where edges are present as seen from the target pixel. By storing the scanning interval at that time in edge-map storage region 23, the length of each edge is also stored.

Next, the detailed procedure of the processing of detecting/generating horizontal edges and vertical edges in steps S42 and S44 shown in FIG. 23 will be described with reference to FIG. 27.

First, cosine α1 of angle φ1 made by unit normal vectors possesed by two pixels is calculated (step S81). The above-described two pixels indicate pixels 1 and 6 in the case of a horizontal edge, and pixels 4 and 6 in the case of a vertical edge shown in FIG. 26. If the unit normal vectors possesed by two pixels are represented by (xi,yi,Zi) and (xj,yj,zj), α1 is expressed by:

$$\alpha1 = \cos\phi1 = x_ix_j + y_iy_j + z_iz_j$$

If |α1|<|α| at that time (step S82), it is determined that a roof edge has been detected or generated (step S83), and the process is terminated. FIG. 28 illustrates the priciple of the detection or generation of a roof edge; (a) indicates a case in which a roof edge is detected/generated, and (b) indicates a case in which a roof edge is not detected/generated.

When the condition shown in step S82 has not been satisfied, the processing of detecting a jump edge is performed. In the processing of detecting a jump edge, first, cosine α2 of angle φ2 made by the unit normal vector of one of the above-described two pixels, and unit normal vector (xk,yk,zk) of the straight line connecting the two pixels is calculated (step S74).

$$\alpha2 = \cos\phi2 = x_ix_k + y_iy_k + z_iz_k$$

At that time, if |α2|>|β| (step S85), it is determined that a jump edge has been detected (step S86). Thus, the processing shown in FIG. 27 is terminated. FIG. 29 illustrates the principle of detecting a jump edge; (a) illustrates a case in which a jump edge has been detected, and (b) illustrates a case in which a jump edge has not been detected.

Next, the detailed procedure of the oblique-edge detection/generation processing in step S43 shown in FIG. 23 will be described with reference to FIG. 30.

First, cosine α11 and cosine α12 of angles φ1 and φ2, respectively, made by unit normal vectors possesed by two pairs of pixels are calculated (step S111). The above-described two pairs of pixels indicate the pair of pixels 2 and 6, and the pair of pixels 3 and 5 shown in FIG. 26. The method of calculating an inner product is the same as in the case of horizontal and vertical edges.

At that time, if $|\alpha11|<\oplus\alpha|$, or $|\alpha12|<|\alpha|$ (step S112), it is determined that a roof edge has been detected or generated. However, as shown in FIG. 25, since the roof edges of codes 2 and 8 cross each other, any one of the roof edges is selected. In the present embodiment, if $|\alpha11|<|\alpha12|$ (step S113), it is assumed that the roof edge of code 8 has been detected or generated (step S114). If the condition of step S118 has not been satisfied, it is assumed that the roof edge of code 2 has been detected or generated, and the process is terminated.

When the condition of step S112 has not been satisfied, the processing of detecting a jump edge is performed. As in the case of horizontal and vertical edges, the detection of a jump edge is performed by calculating the values $\alpha21$ and $\alpha22$ (step S116), and comparing the calculated values with the value $\beta$ (steps S117, S118, S119 and S120).

FIGS. 31(a) through 33(d) are diagrams illustrating results of the operation of the present embodiment. FIG. 31(a) illustrates a result in which the input range image is displayed so that the front side is light and the rear side is dark. FIG. 31(b) illustrates a result in which the input range image is displayed as a bird's-eye view. FIG. 32 illustrates a result in which normal vectors are calculated from the input range image, and are displayed in a so-called "burr-like expression".

FIGS. 33(a) through 33(d) illustrate results in which edge maps formed according to the present embodiment are displayed, and in which the scanning intervals are provided for every two pixels, every four pixels, every eight pixels, and every sixteen pixels, respectively.

Although the present invention has been described in its preferred forms with a certain degree of particularity, many apparently widely different embodiments of the invention can be made without departing from the spirit and scope thereof. It is to be understood that the invention is not limited to the specific embodiments thereof except as defined in the appended claims.

What is claimed is:

1. A range-image processing apparatus, comprising:

input means for inputting a range image;

generating means for generating a plurality of range images having different resolutions from the range image input by said input means;

calculation means for calculating normal vectors for each of the plurality of range images having different resolutions generated by said generation means;

edge-map formation means for forming an edge map for each of the plurality of range images based on the normal vectors corresponding to different resolutions calculated by said calculation means;

synthesis means for forming a single edge map by synthesizing the plurality of edge maps corresponding to different resolutions formed by said edge-map formation means; and polygon-data formation means for forming polygon data for describing the surface shape of the object represented by the range image input by said input means based on the edge map formed by said synthesis means.

2. An apparatus according to claim 1, wherein said generation means makes the range image input by said input means a range image having the highest resolution.

3. An apparatus according to claim 1, wherein, in a synthesis operation, said synthesis means protects edges possessed by a high-resolution range image from among the plurality of edge maps to be synthesized.

4. An apparatus according to claim 3, further comprising correction means for correcting the contour of a low-resolution edge map from among the plurality of edge maps formed by said edge-map formation means before the synthesis operation by said synthesis means.

5. An apparatus according to claim 4, wherein said correction means removes edges corresponding to the contour.

6. A range-image processing apparatus, comprising:

input means for inputting a range image;

calculation means for calculating normal vectors for the range image input by said input means;

edge-map formation means for forming an edge map for the range image based on the normal vectors calculated by said calculation means;

detection means for detecting non-closed edges by scanning the edge map formed by said edge-map formation means;

shape-up means for shaping up the edge map by deleting or extending the non-closed edges detected by said detection means; and polygon-data formation means for forming polygon data for describing the surface shaped of the object represented by the range image input by said input means based on the edge map shaped up by said shape-up means.

7. An apparatus according to claim 6, wherein said shape-up means deletes each edge comprising less than two segments of straight lines.

8. An apparatus according to claim 6, wherein said shape-up means extends each edge comprising at least two segments of straight lines until the edge is connected to another edge.

9. An apparatus according to claim 8, wherein said shape-up means deletes each edge comprising at least two segments of straight lines if the edge goes outside the map before the edge is connected to another edge when the edge is extended.

10. A range-image processing apparatus, comprising:

input means for inputting a range image;

calculation means for calculating normal vectors for the range image input by said input means;

setting means for setting a scanning interval for scanning the range image input by said input means;

edge detection means for scanning the range image input by said input means with the scanning interval set by said setting means, and for detecting edges in the range image based on the input range image and the normal vectors calculated by said calculation means;

edge generation means for generating new edges based on the input range image and the normal vectors calculated by said calculation means; and edge-map formation means for forming an edge map based on the edges detected by said edge detection means and the edges generated by said edge generation means.

11. An apparatus according to claim 10, wherein said edge detection means detects jump edges and roof edges.

12. An apparatus according to claim 10, wherein said edge generation means generates roof edges.

13. A range-image processing method, comprising the steps of:

inputting a range image;

generating a plurality of range images having different resolutions from the input range;

calculating normal vectors for each of the plurality of generated range images having different resolutions;

forming an edge map for each of the plurality of range images based on the calculated normal vectors corresponding to different resolutions;

forming a single edge map by synthesizing the plurality of formed edge maps; and forming polygon data for describing the surface shape of the object represented by the input range image based on the synthesized edge map.

14. A method according to claim 13, wherein when generating the plurality of range images, the input range image is made to be a range image having the highest resolution.

15. A method according to claim 13, wherein, in said synthesizing step, edges possessed by a high-resolution range image from among the plurality of edge maps to be synthesized are protected.

16. A method according to claim 15, further comprising the step of correcting a contour of a low-resolution edge map from among the plurality of formed edge maps before said synthesizing step.

17. A method according to claim 16, wherein said correcting step removes edges corresponding to the contour.

18. A range-image processing method, comprising the steps of:

inputting a range image;

calculating normal vectors for the input range image;

forming an edge map for the range images based on the calculated normal vectors;

detecting non-closed edges by scanning the formed edge map;

performing a shape-up operation which deletes or extends the detected non-closed edges for shaping up the edge map; and forming polygon data for describing the surface shape of the object represented by the input range image based on the shaped-up edge map.

19. A method according to claim 18, wherein said performing step deletes an edge comprising less than two segments of straight lines.

20. A method according to claim 18, wherein said performing step extends an edge comprising at least two segments of straight lines until the edge is connected to another edge.

21. An apparatus according to claim 20, wherein said performing step deletes an edge comprising at least two segments of straight lines if the edge goes outside the edge-map before the edge is connected to another edge when the edge is extended.

22. A range-image processing method, comprising the steps of:

inputting a range image;

calculating normal vectors for the input range image;

setting a scanning interval for scanning the input range image;

scanning the input range image input with the set interval;

detecting edges in the range image based on the input range image and the calculated normal vectors;

generating new edges based on the input range image and the calculated normal vectors; and forming an edge map based on the detected edges and the generated edges.

23. A method according to claim 22, wherein said edge detecting step detects jump edges and roof edges.

24. A method according to claim 22, wherein said edge generating step generates roof edges.

* * * * *

UNITED STATES PATENT AND TRADEMARK OFFICE
CERTIFICATE OF CORRECTION

PATENT NO. : 5,504,847

DATED : April 2, 1996

INVENTORS : Takeo Kimura et al.

It is certified that error appears in the above-identified patent and that said Letters Patent is hereby corrected as shown below:

ON THE TITLE PAGE:

[56] Other Publications

In "Integration of...etc." "Image" should read --Images-- and "Vision Graphics" should read --Vision, Graphics,--.

In "Extracttion of Polygonal...etc." "Extracttion" should read --Extraction--.

In "Range Data...etc." "Processing;" should read --Processing:--.

In "Invariant Surface...etc." "through" should read --Through--.

COLUMN 1

Line 51, "range image" should read --range-image--.

UNITED STATES PATENT AND TRADEMARK OFFICE
CERTIFICATE OF CORRECTION

PATENT NO. : 5,504,847

DATED : April 2, 1996

INVENTORS : Takeo Kimura et al.

It is certified that error appears in the above-identified patent and that said Letters Patent is hereby corrected as shown below:

COLUMN 5

Line 15,   "procedures, data" should read --procedures. Data--.

COLUMN 6

Line 35,   "(21)" should read --(2)--;
   Line 39,   "10" should be deleted;
   Line 42,   "(3)" should read --(3).--;
   Line 45,   "(4)" should read --(4),--;
   Line 50,   "(5)" should read --(5).--;
   Line 60,   "(6)" should read --(6).--;
   Line 65,   "(7)" should read --(7),--.

COLUMN 7

Line 42,   "(8)" should read --(8).--;
   Line 58,   "(9)" should read --(9).--.

UNITED STATES PATENT AND TRADEMARK OFFICE
CERTIFICATE OF CORRECTION

PATENT NO. : 5,504,847

DATED : April 2, 1996

INVENTORS : Takeo Kimura et al.

It is certified that error appears in the above-identified patent and that said Letters Patent is hereby corrected as shown below:

COLUMN 8

Line 67, "(XA, yA, ZA), (XB, yB, ZB)" should read --(xA, yA, zA), (xB, yB, zB)--.

COLUMN 11

Line 49, "threshold 8" should read --threshold $\theta$--;
Line 57, "$\beta=\cos(90°-0)$" should read --$\beta=\cos(90°-\theta)$-- and "S27)" should read --S27).--.

COLUMN 12

Line 36, "(xi, yi, Zi)" should read --(xi, yi, zi)--;
Line 36, "$\alpha 1$" should read --$\gamma 1$--;
Line 40, "$\alpha 1=\cos\phi 1=xixj+yiyj+zizj$" should read --$\gamma 1=\cos\phi 1=xiyi+yiyj+zizj$--;
Line 42, "$|\alpha 1| < |\alpha|$" should read --$|\gamma 1| < |\alpha|$--;
Line 50, "cosine $\alpha 2$" should read --cosine $\gamma 2$--;
Line 55, "$\alpha 2=\cos\phi 2=xixk+yiyk+zizk$" should read --$\gamma 2=\cos\phi 2=nink+yiyj+zizk$.--
Line 57, "$|\alpha 2| > |\beta|$" should read --$|\gamma 2| > |\beta|$--;

UNITED STATES PATENT AND TRADEMARK OFFICE
CERTIFICATE OF CORRECTION

PATENT NO. : 5,504,847

DATED : April 2, 1996

INVENTORS : Takeo Kimura et al.

Page 4 of 5

It is certified that error appears in the above-identified patent and that said Letters Patent is hereby corrected as shown below:

COLUMN 12

Line 66, "cosine $\alpha 11$ and cosine $\alpha 12$" should read --cosine $\gamma 11$ and cosine $\gamma 12$--.

COLUMN 13

Line 6, "$|\alpha 11| < |\alpha|$, or $|\alpha 12| < |\alpha|$" should read -- $|\gamma 11| < |\alpha|$, or $|\gamma 12| < |\alpha|$ --;

Line 9, "$|\alpha 11| < |\alpha 12|$" should read -- $|\gamma 11| < |\gamma 12|$ --;

Line 18, "$\alpha 21$" should read --$\gamma 21$--;

Line 19, "$\alpha 22$" should read --$\gamma 22$--.

UNITED STATES PATENT AND TRADEMARK OFFICE
CERTIFICATE OF CORRECTION

PATENT NO. : 5,504,847

DATED : April 2, 1996

INVENTORS : Takeo Kimura et al.

It is certified that error appears in the above-identified patent and that said Letters Patent is hereby corrected as shown below:

COLUMN 14

Line 27, "shaped" should read --shape--.

COLUMN 16

Line 15, "edge-map" should read --edge map--.

Signed and Sealed this

Twenty-fourth Day of September, 1996

Attest:

BRUCE LEHMAN

Attesting Officer     Commissioner of Patents and Trademarks